(12) United States Patent
Hsu et al.

(10) Patent No.: US 8,189,526 B2
(45) Date of Patent: May 29, 2012

(54) METHOD AND SYSTEM FOR SHARED COMMUNICATION MEDIUM IN WIRELESS COMMUNICATION SYSTEMS

(75) Inventors: Ju-Lan Hsu, Saratoga, CA (US); Huai-Rong Shao, Santa Clara, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 296 days.

(21) Appl. No.: 12/704,362

(22) Filed: Feb. 11, 2010

(65) Prior Publication Data

US 2010/0226343 A1 Sep. 9, 2010

Related U.S. Application Data

(60) Provisional application No. 61/158,177, filed on Mar. 6, 2009, provisional application No. 61/181,605, filed on May 27, 2009.

(51) Int. Cl.
*H04W 72/00* (2009.01)
*H04B 7/212* (2006.01)
*H04J 3/16* (2006.01)
*H04L 12/43* (2006.01)

(52) U.S. Cl. ........ 370/329; 370/347; 370/437; 370/461; 455/450

(58) Field of Classification Search ............... 370/310.2, 370/311–312, 319–321, 328–329, 336–338, 370/342, 346–348, 350, 431–433, 437–439, 370/442–443, 445, 447, 451, 458–459, 461–462, 370/468, 478, 480; 455/434, 450–452.2, 455/464, 509–512

See application file for complete search history.

(56) References Cited

U.S. PATENT DOCUMENTS

| 7,936,782 B2 * | 5/2011 | Qin et al. ................. 370/468 |
| 2005/0165946 A1 | 7/2005 | Stephens |
| 2006/0171418 A1 | 8/2006 | Casini et al. |
| 2008/0175199 A1 * | 7/2008 | Shao et al. ................. 370/329 |

(Continued)

FOREIGN PATENT DOCUMENTS

WO 0235735 A2 5/2002

OTHER PUBLICATIONS

IEEE Computer Society, "802.11™ IEEE Standard for Information technology—Telecommunications and information exchange between systems—Local and metropolitan area networks—Specific requirements, Part 11: Wireless LAN Medium Access Control (MAC) and Physical Layer (PHY) Specifications (Revision of IEEE Std 802.11-1999 )," IEEE, Jun. 12, 2007, pp. i-1184, New York, United States.

(Continued)

*Primary Examiner* — Tri H Phan
(74) *Attorney, Agent, or Firm* — Kenneth L. Sherman, Esq.; Michael Zarrabian, Esq.; Sherman & Zarrabian LLP

(57) ABSTRACT

Performing distributed contention-free communication channel reservation for wireless communication, is disclosed. One implementation involves providing access to a shared communication channel in a wireless network including multiple wireless stations, by performing distributed channel time reservation for contention-free access to a shared wireless channel by each wireless station, based on a prior successful contention by the wireless station for access to the channel in a wireless network.

41 Claims, 19 Drawing Sheets

U.S. PATENT DOCUMENTS

| | | | | |
|---|---|---|---|---|
| 2008/0175265 | A1* | 7/2008 | Yonge et al. | 370/447 |
| 2009/0103501 | A1* | 4/2009 | Farrag et al. | 370/337 |
| 2009/0168713 | A1* | 7/2009 | Shao et al. | 370/329 |
| 2009/0213816 | A1* | 8/2009 | Guo et al. | 370/336 |
| 2010/0002639 | A1 | 1/2010 | Qin et al. | |

OTHER PUBLICATIONS

ECMA International, "Standard ECMA-368, High Rate Ultra Wideband PHY and MAC Standard," 3rd Edition, ECMA International, Dec. 2008, pp. i-330, Geneva, Switzerland.

Lee, S. et al., "Hybrid MAC for VANET (IEEE 802.11-08/1273r1)," IEEE, Nov. 11, 2008, pp. 1-15, United States.

Yang, X. et al., "A Wireless MAC Protocol Using Implicit Pipelining," IEEE Transactions on Mobile Computing, vol. 5, No. 3, IEEE, Mar. 2006, pp. 258-273, United States.

ECMA International, "Standard ECMA-387, High Rate 60GHz PHY, MAC and HDMI PAL," 1st Edition, Ecma International, Dec. 2008, pp. i-328, Geneva, Switzerland.

Zhu, J. et al., "Managed Contention Access—A technique to improve Video Streaming Performance (IEEE 802.11-08/0818r1)," IEEE, Jul. 13, 2008, pp. 1-19, United States.

International Search Report and Written Opinion dated Oct. 19, 2010 for International Application No. PCT/KR2010/001411 from Korean Intellectual Property Office, filed Mar. 5, 2010, pp. 1-8, Seo-gu, Daejeon, Republic of Korea.

* cited by examiner

Wireless Network

| Frame control | Duration /ID | ADD 1 | ADD 2 | ADD 3 | SC | ADD 4 | QoS control | Next scheduled TX | Frame body | FCS |

| Frame control | Duration | RA | TA | Next scheduled TX | FCS |

METHOD AND SYSTEM FOR SHARED COMMUNICATION MEDIUM IN WIRELESS COMMUNICATION SYSTEMS

CROSS-REFERENCE TO RELATED APPLICATIONS

This application claims priority from U.S. Provisional Patent Application Ser. No. 61/158,177 filed on Mar. 6, 2009, and further claims priority from U.S. Provisional Application Ser. No. 61/181,605 filed on May 27, 2009 both incorporated herein by reference.

FIELD OF THE INVENTION

The present invention relates in general to wireless communication systems, and in particular to communication channel time reservation.

BACKGROUND OF THE INVENTION

In a typical wireless network utilizing a coordination function for coordinating transmissions among wireless stations, such a function may be implemented in one of the wireless stations or a coordinator device such as an access point (AP). The wireless stations may be consumer electronics (CE) devices which communicate via directional transmissions using sector antennas and beam forming antenna arrays. The coordinator device may use omnidirectional transmissions for broadcasts to all wireless stations in all directions (e.g., 360 degrees range). Alternatively, the coordinator may use quasi-omnidirectional transmissions for broadcasts to a wide range, but not necessarily in all directions.

In many wireless area networks (WLAN) and wireless personal area network (WPAN) standards, a coordinator station in infrastructure mode is used for providing contention free access to a wireless communication medium to support Quality of Service (QoS) for certain applications such as audio/video (A/V) applications (e.g., multimedia audio and video applications). Many WLAN/WPAN standards such as IEEE 802.11, IEEE 802.15.3, WirelessHD and WiGig, support or fully operate in infrastructure mode, in which a centralized coordinator or access point (AP) is used to control and manage the wireless network.

In the absence of a coordinator, to provide contention-free channel time reservation, existing techniques use announcement or information exchange among wireless stations in a network to negotiate/reserve the use of the communication medium. Specifically, QoS support for A/V applications is achieved using announcement or information exchange according to the IEEE 802.11e Enhanced Distributed Channel Access (EDCA), and the ECMA 368 specifications. EDCA defines four Access Categories (ACs) and introduces service differentiation such that A/V data traffic uses higher priority parameters to contend for the communication medium. However, EDCA does not provide collision free QoS services and bandwidth suffers under high contention. Further, ECMA 368 specification utilizes a multi-band OFDM alliance (MBOA) media access control (MAC) layer with a distributed scheduling protocol to provide communication medium reservation for contention free access. However, MBOA MAC uses a complex multi-beacon mechanism that is inefficient and difficult to manage, especially for 60 GHz wireless networks where most transmissions are not omnidirectional.

Further, in many WLAN and WPAN communication standards that utilize channel time reservation either in a centralized or a distributed manner, legacy wireless stations use contention-based wireless medium access and are unaware of channel time reservation schemes. These legacy wireless stations may contend and occupy channel time which jeopardizes the channel time reservation operations of non-legacy wireless stations.

BRIEF SUMMARY OF THE INVENTION

The present invention provides a method and system for performing distributed contention-free communication channel reservation for wireless communication. One embodiment comprises providing access to a shared communication channel in a wireless network including multiple wireless stations, by performing distributed channel time reservation for contention-free access to a shared wireless channel by each wireless station, based on a prior successful contention by the wireless station for access to the channel in a wireless network.

These and other features, aspects and advantages of the present invention will become understood with reference to the following description, appended claims and accompanying figures.

BRIEF DESCRIPTION OF THE INVENTION

FIG. 4 shows an example modified MAC data frame format, according to the invention.

FIG. 5 shows an example modified MAC control frame format for RTS signaling, according to the invention.

DETAILED DESCRIPTION OF THE INVENTION

Figure 1:
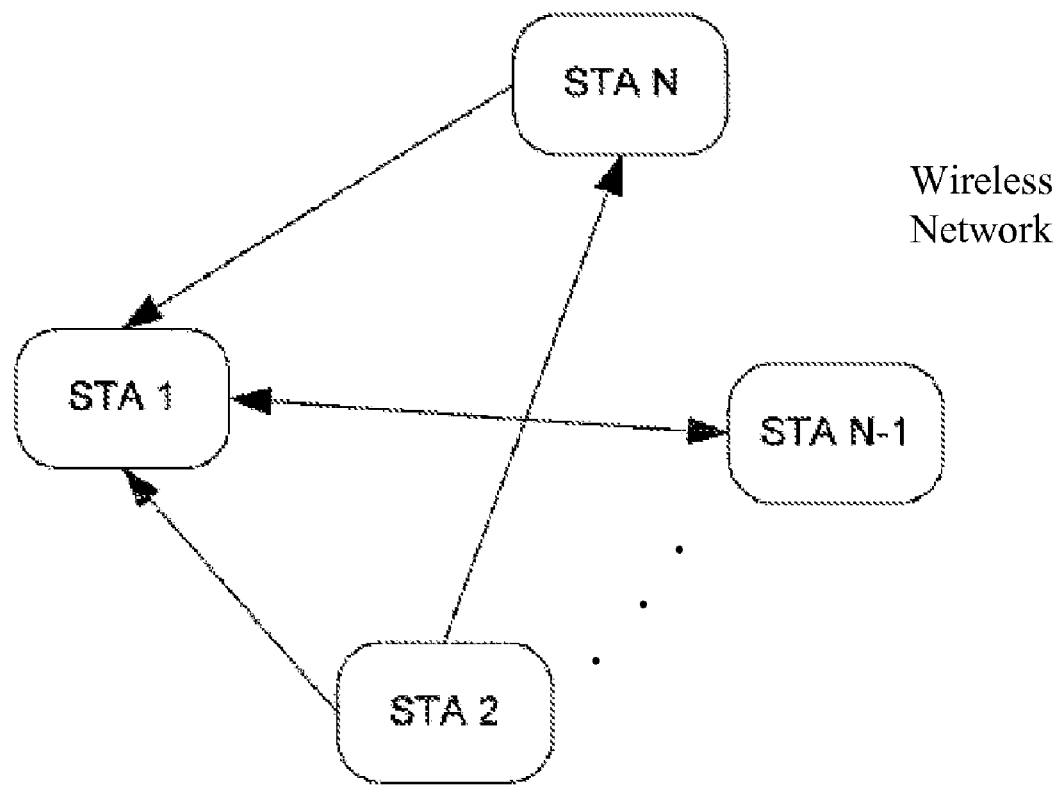
FIG. 1 shows a block diagram of a wireless network implementing distributed contention-free communication channel reservation, according to an embodiment of the present invention.

The present invention provides a method and system for performing distributed contention-free communication channel reservation for wireless communication.

According to an embodiment of the invention, a wireless communication system comprises multiple wireless stations that share a wireless communication medium such as a Radio Frequency (RF) channel. In one embodiment of the invention, channel reservation (channel allocation) is performed for shared access to a channel based on past contention results, wherein a coordinator function is not required. A distributed channel access method is provided that leverages previous successful contention experiences of a wireless station in a wireless network.

The wireless communication system comprises a wireless network of multiple wireless stations, wherein the baseline channel access scheme is contention-based. In one implementation, the baseline contention-based access is based on Carrier Sense Multiple Access With Collision Avoidance (CSMA/CA) in the IEEE 802.11 standard.

The wireless stations do not require any announcement or explicit information exchange to negotiate/reserve access to the channel. The wireless stations retain information about ("remember") their successful contentions and leverage such information for scheduling contention-free reservations. If a wireless station successfully contends for a channel time block (CTB) for channel access, the wireless station retains (e.g., in memory) the timing of the successful contention and attempts to duplicate such successful channel access in the future. This eventually results in a contention-free, reservation-based channel access in a similar CTB.

A wireless station enters an assessment stage to observe whether it can reserve (i.e., own) a target (intended) CTB without interfering with other channel transmissions that already reserve the target CTB. If the wireless station concludes that it can reserve the CTB without interfering with other channel transmissions that already reserved the target CTB, then the wireless station becomes the CTB-owner by reserving the target CTB, and thereby has a contention-free reservation in the CTB until it releases such ownership or until such ownership expires.

The present invention is applicable to IEEE 802.11 contention-based MAC framework and also millimeter wave (mmW) network systems. The invention is also suitable for audio/video (A/V) QoS centric isochronous/asynchronous traffic.

A frame structure is used for data transmission between wireless stations such as a transmitter station and a receiver station. In one example, a frame structure in a Media Access Control (MAC) layer and a physical (PHY) layer is utilized, wherein in a transmitter station, a MAC layer receives a MAC Service Data Unit (MSDU) and attaches a MAC header thereto, in order to construct a MAC Protocol Data Unit (MPDU). The MAC header includes information such as a source address (SAs) and a destination address (DA). The MPDU is a part of a PHY Service Data Unit (PSDU) and is transferred to a PHY layer in the transmitter to attach a PHY header (i.e., PHY preamble) thereto to construct a PHY Protocol Data Unit (PPDU). The PHY header includes parameters for determining a transmission scheme including a coding/modulation scheme. The PHY layer includes transmission hardware for transmitting data bits over a wireless link. Before transmission as a packet from the transmitter station to the receiver station, a preamble is attached to the PPDU, wherein the preamble can include channel estimation and synchronization information.

Further, a superframe structure is utilized which includes superframes separated by beacons. According to an embodiment of the invention, there is a predefined sequence of CTBs for channel access in each superframe. Each CTB provides opportunity for contention-free access and for all-access (i.e., contention). The period for contention-free access (i.e., contention-free period) begins earlier than a partially overlapping period for contention access (i.e., contention period). In other words, a contention access scheme may join the contention-free scheme during the CTB. Each CTB may be utilized for contention-based or contention-free access. If a wireless station reserves a CTB then it has contention-free access to the channel during that CTB, otherwise the station utilizes contention-based access.

A wireless station that desires to reserve a CTB for contention-free access to the channel must first contend for a CTB. If the wireless station successfully contends in a CTB, then the wireless station remembers the timing (i.e., which CTB) of the successful contention and attempts to reserve the same CTB accordingly in the future. The wireless station leverages such information for scheduling contention-free reservations in a superframe. This is different from the IEEE 802.11 backoff mechanism where stations remember the aggregate number of unsuccessful contentions and perform deeper backoffs. Further, the IEEE 802.11 backoff does not exploit any timing information of the past contention results and channel access timing will always be random.

The predefined sequence of channel time blocks (CTBs) in a superframe is known by every wireless station and is indicated by the start timing of each of the CTBs. An example communication process according to the invention includes the following general steps. Every wireless station that engages in transmission in a CTB must finish by the end of the CTB. In the beginning of a CTB, a scheduled transmission initiates in the contention-free period of the CTB. Only an owner of the CTB may initiate transmission in the contention-free period of the CTB.

In case of multiple CTB-owner stations (i.e., each of multiple wireless stations owns at least one CTB) there can be multiple CTB-owner wireless stations, each owner station owning a non-overlapped subset of CTBs in a superframe. In case of a single CTB-owner station (i.e., only a single wireless station owns at least one CTB), there can be only one owner wireless station for the channel.

FIG. 1 shows a block diagram of a wireless local area network (WLAN) that implements wireless communication between N wireless stations (e.g., wireless stations STA1, ..., STAN) on a 60 GHz frequency band, according to an embodiment of the present invention. Each wireless station may comprise a processor, memory, wireless transceiver and logic/circuits for wireless communication according to embodiments of the invention. The clock of every station in the network is synchronized. Station STA1 may use the baseline contention protocol (e.g., CSMA/CA) to contend for channel time outside the contention-free period in the CTB. If station STA1 successfully contends in the CTB, it remembers the timing (i.e., which CTB) of the successful contention and attempts to duplicate such successful channel access in future CTBs, eventually resulting in a contention-free, reservation-based channel time access in either (i) same CTB location in the future superframes in case of multiple CTB-owner stations, or (ii) any set of subsequent CTBs within the current superframe or in future superframes in case of a single CTB-owner station, according to the traffic specification/pattern of station STA1.

To leverage information about a prior successful channel contention in a CTB, the station STA1 enters an assessment stage and observes whether its transmissions during a target CTB may cause interference to any existing owner of the CTB in the coming superframe(s), or whether it causes interference to any existing owner of the CTB in upcoming CTB(s) in the current superframe.

If the station STA1 concludes that it does not cause such interference, it may become an owner of the target CTB. Once station STA1 becomes an owner of the target CTB, the station STA1 may always initiate channel access in the contention-free period of the CTB and schedule transmissions, until station STA1 releases its ownership of the CTB or until its ownership expires.

A wireless station assesses whether it may become the CTB-owner for a predefined duration such that ownership of CTBs is obtained one-by-one without conflict with other CTB-owner stations. A wireless station may always contend for the (part of) CTBs that it finds unused by any CTB-owner station outside the contention free periods. For schedule fairness, contention-based channel access priorities may be specified as functions of the quantity of CTB-ownership (e.g., the higher the quantity of CTB-ownership for a wireless station, the lower the priority of the wireless station in contention-based channel access).

Figure 2:
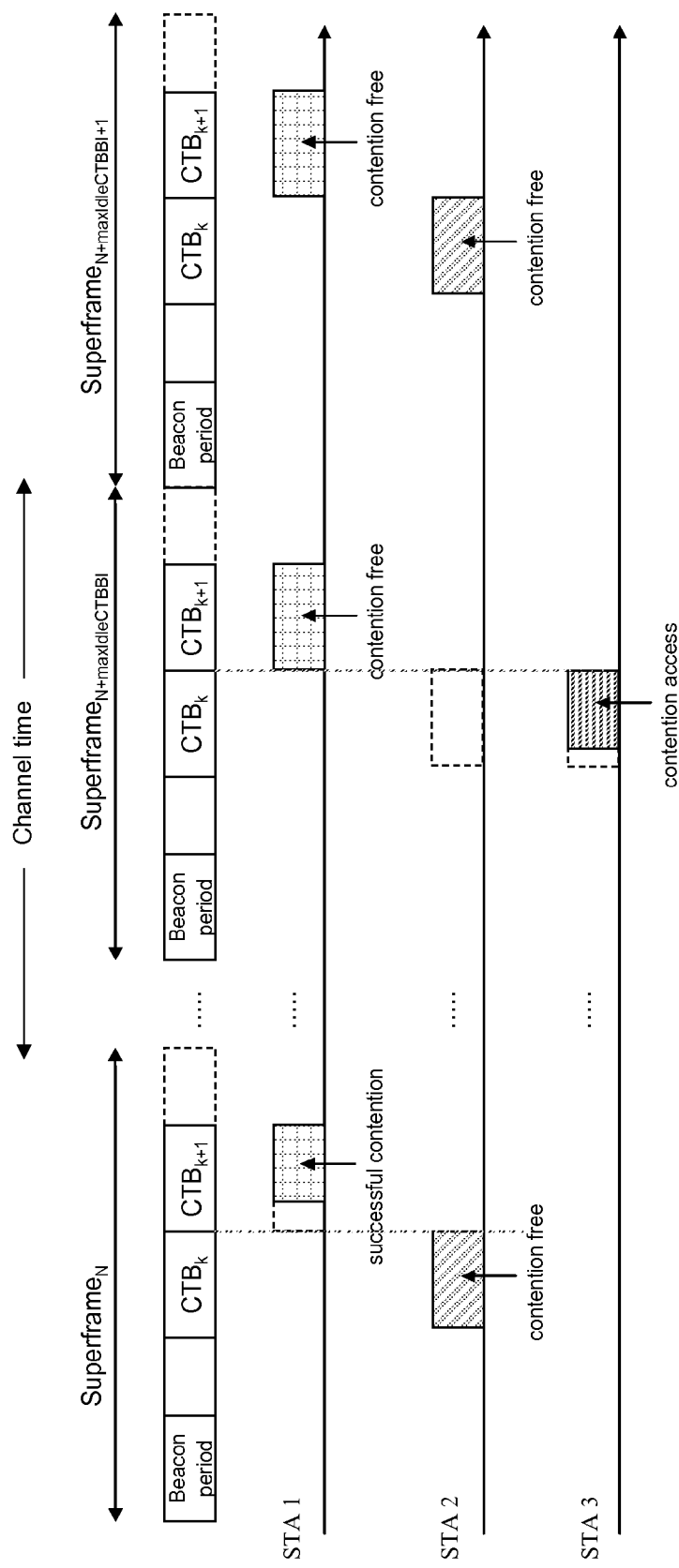
FIG. 2 illustrates an example channel time block (CTB) reservation and access protocol for multiple wireless stations as channel time block owners, according to the present invention.

FIG. 2 illustrates an example channel time reservation and access protocol 20 in the case of multiple wireless stations as CTB-owners, according to an embodiment of the invention. Each superframe begins with a beaconing period and includes a sequence of multiple predefined CTBs.

Beacons divide the channel time into multiple superframes, each superframe including one or more CTBs, each CTB providing opportunities for contention-free access (CFP) and contention access (CP). In a CFP of a reserved CTB, there may be one or more scheduled transmissions. However, a CTB-owner station need not schedule a transmission in every reserved CTB as long as the CTB-owner station does so frequently enough to maintain CTB ownership. As such, there may be instances in which there are no scheduled transmissions in a CFP of a reserved CTB.

As illustrated in FIG. 2, a wireless station must first successfully contend for channel access during a CTB in order to become a contention-free CTB-owner in subsequent CTBs within the current or later superframes.

In the example shown in FIG. 2, wireless station STA1 successfully contends for $CTB_{k+1}$ in $superframe_N$ and observes no other reservation. As such, station STA1 becomes a CTB-owner starting in $superframe_{N+maxIdleCTBBI}$, where maxIdleCTBBI is a predefined integer. The value maxIdleCTBBI−1 represents the maximum number of superframes for which a CTB-owner can remain idle (i.e., not using its CTB reservation) without losing its ownership.

Wireless station STA2 is the owner of $CTB_k$ but does not use it in $superframe_{N+maxIdleCTBBI}$. Wireless station STA3 begins contending for a CTB in $superframe_{N+maxIdleCTBBI}$, and station STA2 begins using its reservation for $CTB_k$ again in $superframe_{N+maxIdleCTBBI+1}$. Station STA3 upon observing contention-free access to the channel by station STA2 during $CTB_k$ in $superframe_{N+maxIdleCTBBI+1}$, cannot become owner of $CTB_k$. Further details of channel time reservation for access to the channel are described below.

CTB Access Timing

Figure 3:
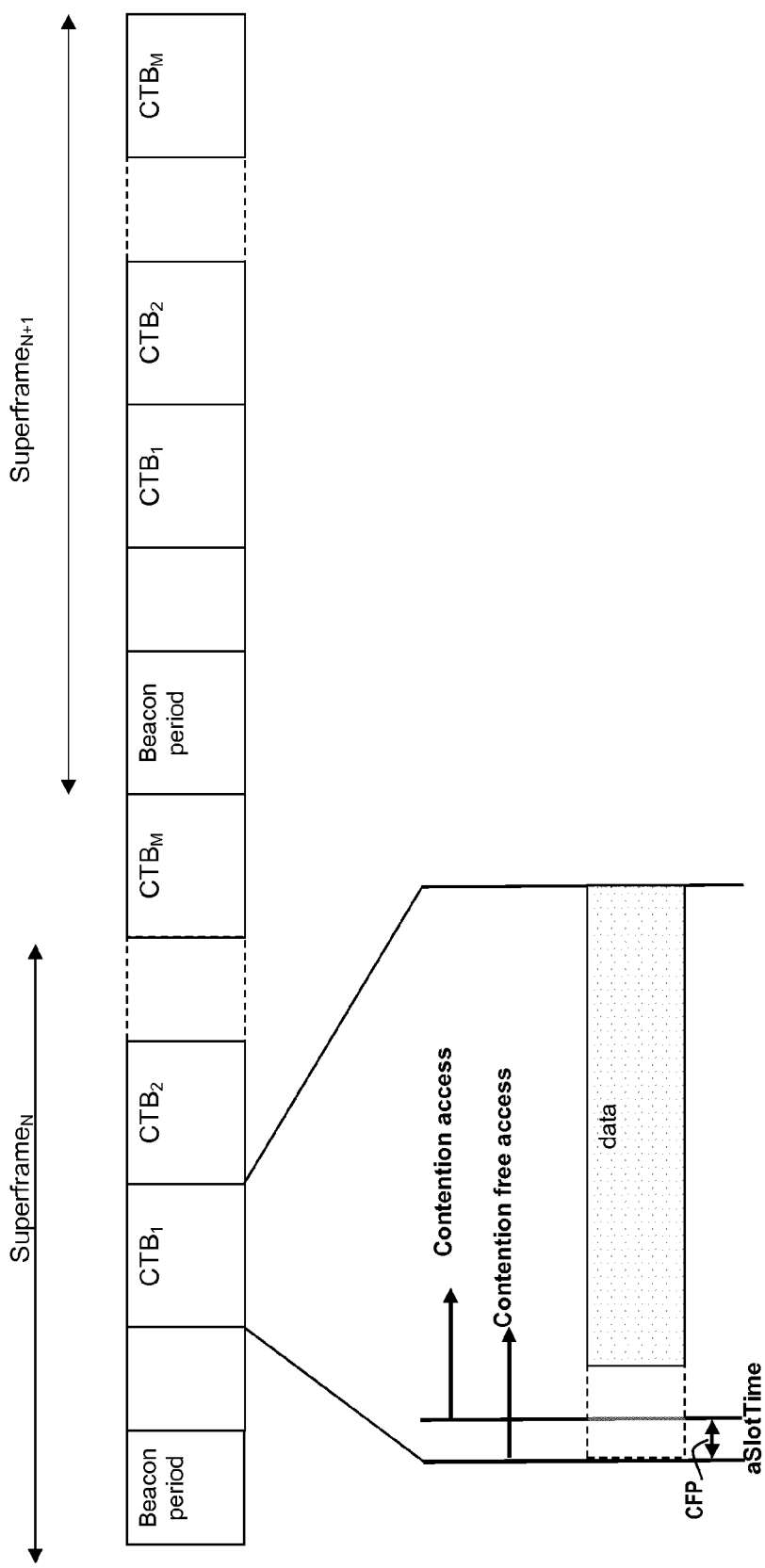
FIG. 3 illustrates examples of contention access and contention free channel access within a channel time period, according to the invention.

FIG. 3 illustrates details of $superframe_N$, and further illustrates that each CTB provides contention-free access timing and contention access timing, according to an embodiment of the invention. An aSlotTime period indicates a contention-free period in the CTB, which is long enough for a wireless station with a scheduled transmission to secure its access to the channel during the CTB.

The contention-free access timing is set to the beginning of the CTB. A scheduled transmission in the CTB takes place at the scheduled contention-free access timing and does not need to contend. If there is no scheduled transmission taking place in the CTB, then at the contention access timing, wireless stations may start to contend for the CTB using a conventional contention MAC protocol. A contending wireless station must monitor the channel for scheduled transmissions from the start of the CTB. The contending wireless station must monitor the channel by listening to the channel and performing carrier sensing and/or virtual carrier sensing, in order to detect scheduled transmissions. This is to avoid deafness to previously secured transmissions in the CTB. A wireless station that successfully contends for channel access in a CTB may use the channel until, at the maximum, the end of the CTB. All transmissions (including contention-free and contention-based) must end before the end of the CTB.

The timing difference aSlotTime between a scheduled access and a contention access in a CTB depends on the underlying MAC and PHY layers. The purpose of this timing difference is to provide sufficient time for contending wireless stations to recognize the presence of scheduled transmissions and to refrain from contending for the CTB in such a case. For example, in 2.4 GHz or 5 GHz IEEE 802.11 wireless networks, this timing difference is set to minimum time necessary to continuously sense the wireless channel, wherein aSlotTime is given by relation (1) below as:

$$aSlotTime = aCCATime + aRxTxTurnaroundTime + aAirPropagationTime + aMACProcessingDelay \quad (1)$$

where aCCATime represents the time for clear channel assessment, aRxTxTurnaroundTime represents the receive-to-transmit turnaround time of the hardware, aAirPropagationTime represents the propagation delay in the air, and aMACProcessingDelay represents the MAC layer processing delay.

In other wireless networks such as 60 GHz, hidden terminals may exist due to RF directionality or topology commonly, and transmissions are protected from interference using request-to-send/clear-to-send (RTS/CTS) mechanisms. In such a case, the length of aSlotTime can be set equal to the minimum time necessary to sense the CTS message in the channel according to relation (2) below as:

$$aSlotTime = aRTSTime + aSIFSTime + aCCATime + aRxTxTurnaroundTime + aAirPropagationTime + aMACProcessingDelay \quad (2)$$

where aRTSTime and aSIFSTime represent the RTS time and the SIFS time, respectively.

According to an embodiment of the invention, transmission schedule assignment is performed using a baseline distributed schedule management (e.g., CSMA/CA) on a per-CTB basis. Examples of obtaining, maintaining and terminating CTB-ownership for a wireless station are described below.

Obtaining CTB-Ownership

Initially, every wireless station in the WLAN (FIG. 1) starts as a contention access station for a given CTB in a superframe. In case of multiple wireless stations as CTB-owners, for a station to gain scheduled access to the CTB, the station must meet two conditions: (1) the station successfully contends for the channel in the CTB and uses the remainder of the CTB, and (2) by monitoring the channel, the station does not detect any scheduled access to the CTB for the subsequent maxIdleCTBBI−1 superframes.

Where a single station can be a CTB-owner, for a wireless station to gain scheduled access to the CTB, the station must meet two conditions: (1) the station successfully contends for the channel in the CTB and uses remainder of the CTB, and (2) by monitoring the channel, the station does not detect any scheduled access to the CTB for the subsequent maxIdleCTB-1 channel time blocks.

For each case, when the corresponding conditions are met, the wireless station may configure itself to become an owner to the CTB starting at the next CTB in the single CTB-owner case, or the next superframe in case of multiple stations as CTB-owners. After a station successfully contends in a CTB and before it may become an owner of the CTB, the station still uses contention-based access. A station that newly gains scheduled access to the CTB must transmit in its first contention-free period as a CTB-owner to secure the wireless channel, so that other contention wireless stations that also desire to become the CTB-owner recognizes this station as a new CTB-owner.

Maintaining CTB-Ownership

In order for a CTB-owner wireless station to maintain its ownership of the CTB, the station must successfully complete a scheduled transmission, including: (1) at least once every maxIdleCTBBI superframes in case of multiple stations as CTB-owners, or (2) at least once every maxIdleCTB CTBs in case of a single CTB-owner station. Otherwise, the station loses its contention-free access to the CTB and needs to contend if it wishes to use the CTB again.

Terminating CTB-Ownership

A CTB-owner wireless station that does not wish to maintain its contention-free access status may simply cease to attempt transmissions in the scheduled contention-free period. The station will automatically lose its ownership and will release the CTB after it fails to maintain its CTB-ownership. This is referred to as an implicit CTB release. An explicit CTB release mechanism is described further below.

Maintaining Fairness for CTB Management

In case of multiple stations as CTB-owners, to prevent a wireless station from attempting to reserve every CTB while other stations starve, fairness mechanisms are imposed. For example, each station may be instructed to backoff from contention differently depending on how many CTBs it has reserved, so that channel access priority is non-increasing with the amount of CTB-ownership.

Example Application Scheduling in IEEE 802.11 Ad Hoc Mode

Conventional IEEE 802.11 ad hoc mode is a distributed MAC scheme for point-to-point communications when an access point (AP) or coordinator is not present, wherein contention-free access functionality is not supported. Every wireless station participates in beacon generation by performing random backoff. The beaconing mainly serves for synchronization purposes.

According to an embodiment of the present invention, however, the wireless stations use omni-directional antenna mode to wirelessly transmit/receive information over the wireless channel. After a distributed beaconing period and Announcement Traffic Information Message (ATIM) window when all stations are required to be awake, the beacon interval can be divided into multiple CTBs. Wireless stations may accordingly use existing CSMA/CA based Distributed Coordination Function (DCF) or Enhanced Distributed Channel Access (EDCA) MAC to contend for the channel and establish contention-free schedules using distributed channel access reservation according to the invention. If the wireless network stations (nodes) are fully connected, then the stations may use relation (1) above to set up the timing in a CTB. If the stations are not fully connected or are in multi-hop mode, then the stations may use relation (2) above to set up the timing in a CTB to reduce a hidden terminal problem.

According to an embodiment of the invention, a schedule management process is provided for CTB-owner stations to transmit data, control, or management frames using the frame formats in FIGS. 4-7 to enhance efficient CTB utilization. Specifically, schedule announcements can be performed in the MAC header or as information elements (IEs) in management frames of a superframe. A modified frame format is used for scheduled transmissions to facilitate enhanced schedule management, described below.

MAC Data Frame for Scheduled Transmissions

An example modified MAC data frame format for a data frame 40 according to the invention is shown in FIG. 4 based on IEEE 802.11 data frame format. The modified data frame format 40 includes an added "next scheduled TX" field denoting the next scheduled CTB for transmission by the initiator of the frame, including: (1) in number of superframes for multiple stations as CTB-owners, or (2) in number of CTBs or in CTB index, for a single CTB-owner case. In the latter case, the "next scheduled TX" field values should not be higher than maxIdleCTBBI.

MAC Control Frames for Scheduled Transmissions

Figure 6:
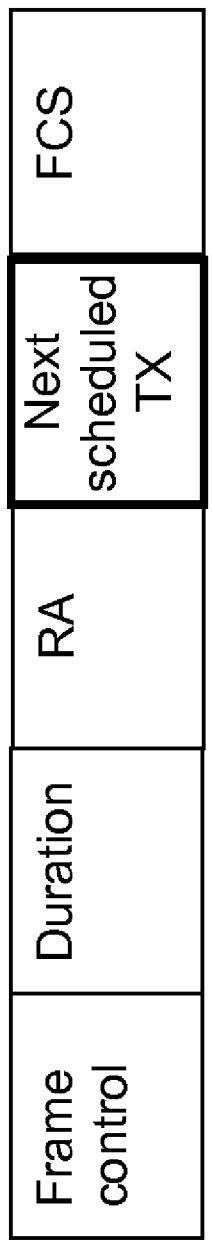
FIG. 6 shows an example modified MAC control frame format for CTS signaling, according to the invention.

Similarly, examples of modified MAC control frame format 50 and 60 for a RTS control frame and a CTS control frame are shown in FIG. 5 and FIG. 6, respectively, each including an added "next scheduled TX" field, according to an embodiment of the invention.

Schedule Information Element

Figure 7:
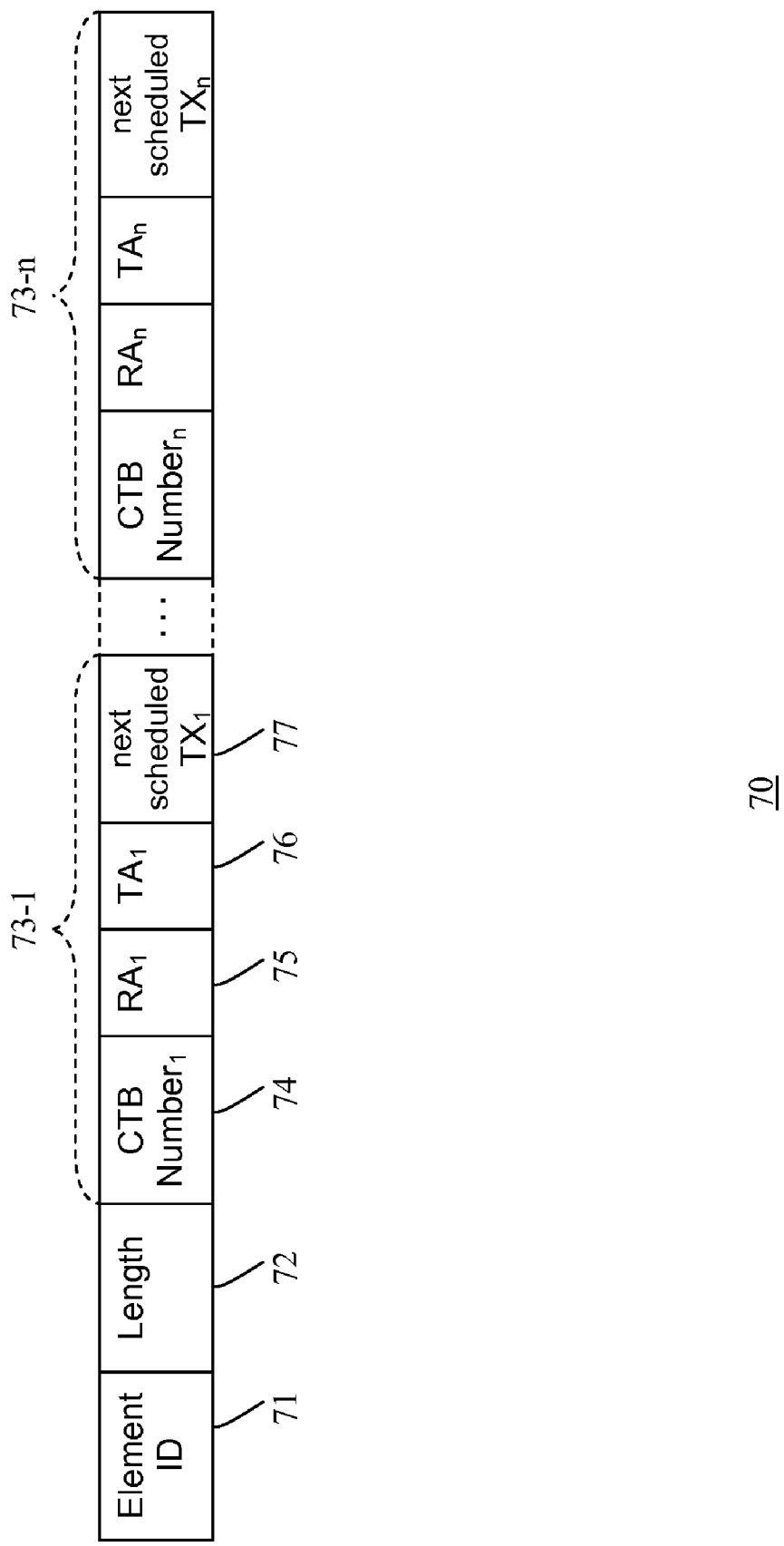
FIG. 7 shows an example format for a schedule information element (IE) in a superframe, according to an embodiment of the invention.

FIG. 7 shows format of a schedule information element (IE) 70 according to an embodiment of the invention. The schedule information element 70 starts with an Element ID 71, indicating its purpose, and a Length field 72, indicating the length of this IE. The schedule IE further includes one or more CTB schedule information fields 73 (i.e., indexed as 73-1, ..., 73-n), including CTB Number 74, a scheduled receiver (RX) address RA 75 for the CTB, a scheduled transmitter (next scheduled TX) address TA 76 for the CTB, and a "next scheduled TX" field 77.

Enhanced Schedule Management Mechanism

A contention-free transmission adopts the MAC frame format 40 (FIG. 4) or the RTS/CTS control frame formats 50, 60 (FIGS. 5-6), depending on whether the basic channel access scheme or the RTS/CTS channel access scheme is used. In this manner, a contention access wireless station that receives a scheduled transmission MAC frame (FIGS. 4-6) may use the next scheduled TX field in the received MAC frame to determine whether it wishes to contend for ownership of a CTB in the upcoming superframes or not. Similarly, a wireless station may also send and receive schedule information including the timing of the upcoming scheduled transmissions, to achieve the same goal.

The schedule information enables contention access wireless stations to utilize the wireless channel more efficiently when scheduled transmissions are not present. Contention access wireless stations may thus allocate their resources more effectively, and react to scheduling dynamics rapidly. In one example, when the next scheduled TX field is set to all "1"s, the scheduled transmission indicates that the CTB-owner station will stop its schedule access to the CTB, allowing contention access wireless stations to own the CTB and gain contention free access more rapidly. This method is referred to as explicit CTB release herein.

Scheduling in Infrastructure-Less Mode in mmW Systems

The present invention is useful in either infrastructure mode (using a coordinator) or infrastructure-less mode where only a limited function coordinator is available involving a coordinator with relatively limited functionalities/resources which does not provide scheduling services. In infrastructure mode, beacons for time synchronization are transmitted by the coordinator in infrastructure mode and by any wireless station in infrastructure-less mode (as in IEEE 802.11 ad hoc mode.) Unlike conventional infrastructure mode, according to the invention the beacons used in infrastructure mode (with limited coordinator function) do not contain any control information between stations. After a beacon period, the superframe is divided into multiple CTBs.

In one implementation, it is assumed that wireless stations may use beamforming to transmit and receive data. Most 60 GHz wireless transmissions are not truly omnidirectional and omnidirectional mode is simply a special case. As there are often hidden terminal problems associated with directional communications, according to the invention all wireless station transmissions in the CTBs, including contention-free and contention-based, employ RTS/CTS using the same antenna configuration for data transmission to secure their channel access. Spatial reuse of concurrent reservations is achieved, without requiring stations to negotiate, announce reservations or compare antenna indexes for spatial reuse.

Figure 8:
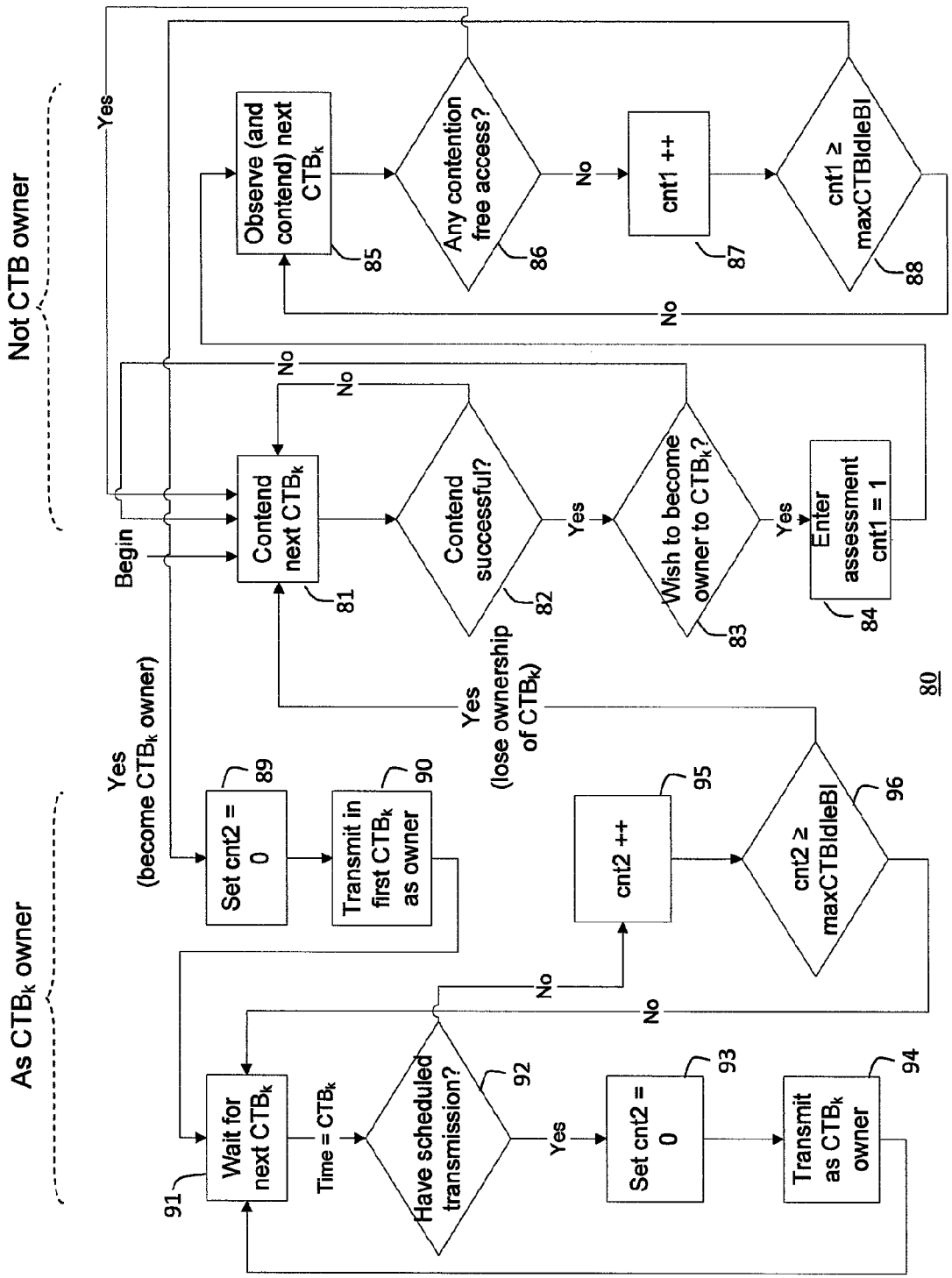
FIG. 8 shows a process for multiple wireless stations as CTB-owners in a WLAN, according to an embodiment of the invention.

FIG. 8 shows a process 80 implemented by a wireless station operation for multiple stations as CTB-owners in a WLAN, according to an embodiment of the invention. The process 80 comprises the following process blocks for a wireless station:

Block 81: Begin as non-CTB-owner station and contend for a next $CTB_k$.

Block 82: Contention successful? If yes, proceed to block 83, else proceed to block 81.

Block 83: Wish to become owner of $CTB_k$? If yes, proceed to block 84, else proceed to block 81.

Block 84: Enter assessment phase and set cnt1=1.

Block 85: Monitor (observe) the channel and contend for $CTB_k$.

Block 86: Any contention-free access opportunity detected? If yes, proceed to block 81, else proceed to block 87.

Block 87: Increment cnt1 by one.

Block 88: Determine if cnt1≧maxCTBIdleBI. If yes, proceed to block 89, else proceed to block 85.

Block 89: Become $CTB_k$-owner station and Set cnt2=0.

Block 90: Transmit in first $CTB_k$ on the channel as CTB-owner station.

Block 91: Wait for next $CTB_k$.

Block 92: When current time is at the beginning of the next $CTB_k$, determine if a transmission is scheduled. If yes, proceed to block 93, else proceed to block 95.

Block 93: Set cnt2=0.

Block 94: Transmit as $CTB_k$ owner on the channel. Proceed to block 91.

Block 95: Increment cnt2 by two.

Block 96: Determine if cnt2≧maxCTBIdleBI. If yes, lose ownership of the $CTB_k$ and proceed to block 81, else, proceed to block 91.

The process blocks 89-96 on the left side of FIG. 8 provide the states that a station is in as a CTB-owner, and the process blocks 81-88 on the right side provide the states that a station is in as a contention access station (not CTB-owner).

Figure 9:
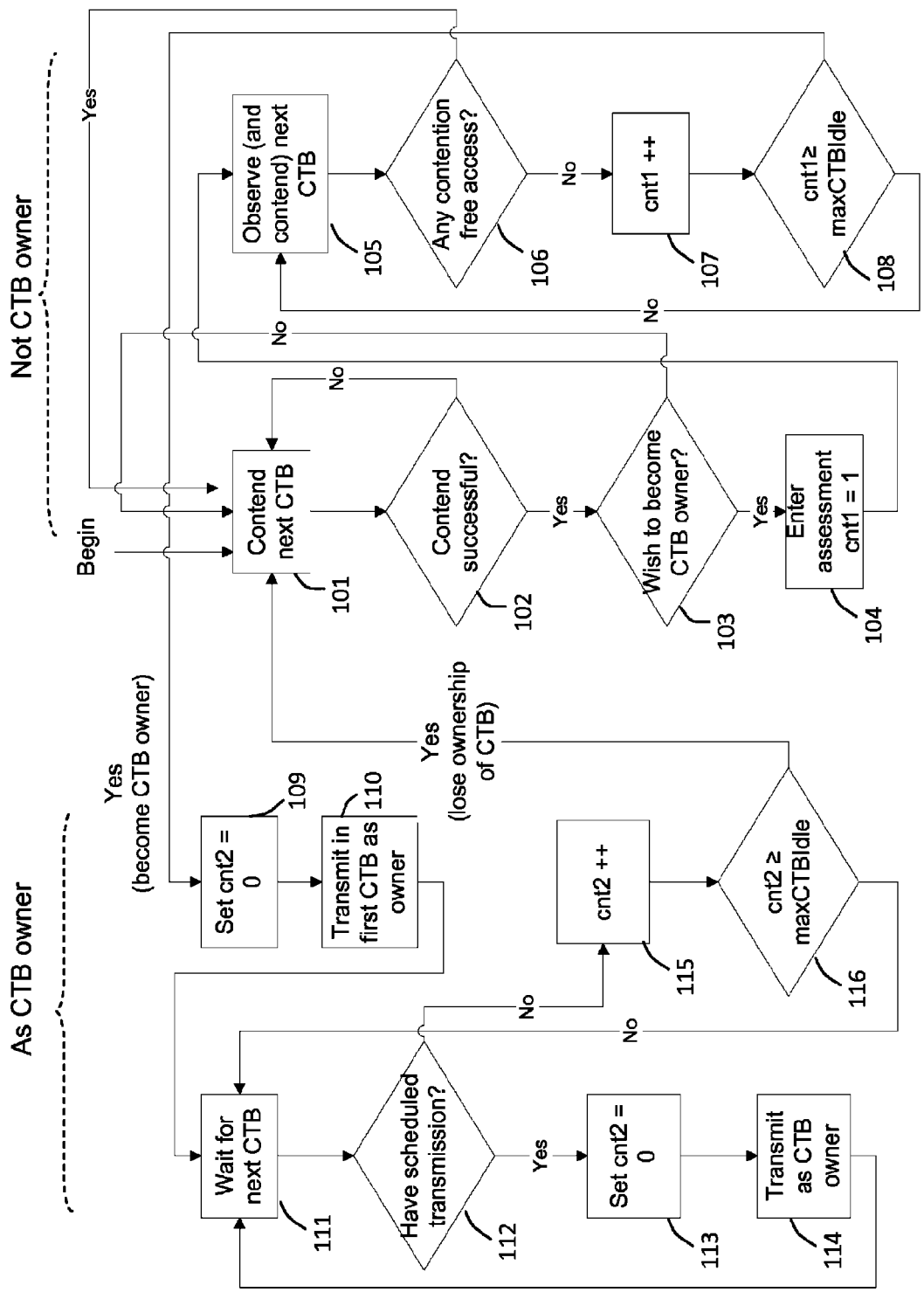
FIG. 9 shows a process for a wireless station as CTB-owner in a WLAN, according to an embodiment of the invention.

FIG. 9 shows a process 100 implemented by a wireless station operation where a single CTB-owner exists in a WLAN, according to an embodiment of the invention. The process 100 comprises the following process blocks for a wireless station:

Block 101: Begin as non-CTB-owner station and contend for a next CTB.

Block 102: Contention successful? If yes, proceed to block 103, else proceed to block 101.

Block 103: Wish to become owner of CTB? If yes, proceed to block 104, else proceed to block 101.

Block 104: Enter assessment phase and set cnt1=1.

Block 105: Monitor (observe) the channel and contend for next CTB.

Block 106: Any contention-free access opportunity detected? If yes, proceed to block 101, else proceed to block 107.

Block 107: Increment cnt1 by one.

Block 108: Determine if cnt1≧maxCTBIdle. If yes, proceed to block 109, else proceed to block 105.

Block 109: Become CTB-owner and set cnt2=0.

Block 110: Transmit in first CTB on the channel as CTB-owner station.

Block 111: Wait for next CTB.

Block 112: Determine if a transmission is scheduled. If yes, proceed to block 113, else proceed to block 115.

Block 113: Set cnt2=0.

Block 114: Transmit on the channel as CTB-owner station. Proceed to block 111.

Block 115: Increment cnt2 by two.

Block 116: Determine if cnt2 maxCTBIdle. If yes, lose ownership of the CTB and proceed to block 101, else, proceed to block 111.

The process blocks 109-116 on the left side of FIG. 9 provide the states that a station is in as a CTB-owner, and the process blocks 101-108 on the right side of FIG. 9 provide the states that a station is in as a contention access station (not CTB-owner).

Support for Diverse Applications/Data Traffic

A distributed channel access reservation according to the invention is versatile for all types of data including A/V and data traffic. For example, contention-free channel time reservation is suitable for scheduling isochronous traffic over the wireless channel. Further, wireless stations can reserve channel time for asynchronous traffic and use contention-free channel access when an outgoing buffer is not empty, meanwhile dynamically allowing data traffic to seize the wireless channel not in use. In addition, the distributed channel access reservation allows wireless stations with data and bursty traffic use contention to dynamically gain channel access as needed.

According to the invention, a wireless station retains past successful contention result information, and uses such information to perform contention-free reservations (by contrast, the conventional IEEE 802.11 backoff protocol simply uses past unsuccessful contention results to passively avoid collisions). The invention also takes advantages of timing information of past contention results, which is an essential part of scheduling (by contrast, the conventional IEEE 802.11 backoff protocol does not exploit the timing information of past contention results and always randomizes its channel access behavior).

Further, the invention does not require any announcements or information exchange, while the conventional disjoint Network Allocation Vector (NAV) scheme requires regular signaling overhead. The invention is not only suitable for scheduling pseudo static isochronous traffic, but also for asynchronous traffics. Once a wireless station becomes a CTB-owner, it may always have contention-free access to the CTB until it either releases its CTB-ownership or its ownership expires.

An example implementation of the invention is for a 60 GHz frequency band WLAN. Such implementation is useful with Wireless HD (WiHD) applications. Wireless HD is an industry-led effort to define a wireless digital network interface specification for wireless HD digital signal transmission on the 60 GHz frequency band, e.g., for consumer electronics (CE) and other electronic products. An example WiHD network utilizes a 60 GHz-band mmWave technology to support a physical (PHY) layer data transmission rate of multi-Gbps (gigabits per second), and can be used for transmitting uncompressed high definition television (HDTV) signals wirelessly.

The present invention is useful with other wireless communication systems as well. Embodiments of the invention may be utilized with conventional IEEE 802.11 contention MAC framework, wherein the invention enables a hybrid TDMA (Time Division Multiple Access)–CSMA/CA operation. Wireless stations retain information about their successful contentions and leverage such information for scheduling future contention-free reservations in a superframe. The baseline reservation mechanism (e.g., CSMA/CA) does not rely on schedule announcements. Schedule management enhancements enable highly effective utilization and fast, dynamic schedule adaptation. The invention does not assume any specific network deployments, RF properties, radio or antenna capabilities, making it a reliable, generic, and highly applicable solution to many wireless networks. Spatial reuse is naturally achieved in a distributed and straightforward fashion. The invention is not limited by hidden terminal or deafness problems. The invention allows scheduling both isochronous and asynchronous AV (Audio/Video) traffic, while also remaining flexible for contention-based dynamic access.

In another embodiment, the present invention allows distributed channel time reservation in legacy coexistent wireless networks such as an IEEE 802.11-based wireless network. This provides backward compatibility. Such a network may include legacy wireless stations which are unaware of the medium access rules under non-legacy channel time reservation schemes such as IEEE 802.15.3.

This embodiment provides a process to "spoof" the legacy stations in a wireless network to behave in a certain manner, without jeopardizing channel time reservation operations of reservation-aware stations (i.e., non-legacy wireless stations) described above in relation to FIGS. 1-9. Legacy contention-based stations and reservation-aware stations may coexist in the same IEEE 802.11 based network or in neighboring networks (e.g., overlapping basic service sets (BSS)). The reservation-aware stations enable a channel time reservation medium access which legacy stations are unaware of.

The invention provides a timing-based spoofing process in a wireless network (e.g., WLAN) that supports guaranteed timing access for reservations in the presence of legacy stations. Such a wireless network may include multiple stations that share a wireless transmission channel. The baseline of the wireless medium access scheme in the network is contention-based, such as Carrier Sense Multiple Access with Collision Avoidance (CSMA/CA) in IEEE 802.11. Legacy stations are only aware of the baseline medium access scheme.

Coexisting with the baseline medium access scheme is a channel time reservation scheme for non-legacy stations to reserve channel time blocks (CTBs) in a superframe. CTB-aware stations follow the channel (medium) access rules under the channel time reservation scheme. As noted, a superframe structure includes superframes separated by beacons. Each CTB may be utilized for contention-based or contention-free access. If a station reserves a CTB then it has contention-free access to the CTB, otherwise it uses contention-based access. Each CTB provides contention-free access and all-access (i.e., contention access) opportunities. When there are no legacy IEEE 802.11 stations in the wireless network, CTB-aware stations can operate in the green-field mode. When there are legacy IEEE 802.11 stations in the network, CTB-aware stations operate in a mixed mode in order to coexist with legacy stations. The invention provides a timing-based spoofing process for CTB-aware stations to operate in the mixed mode.

Figure 10:
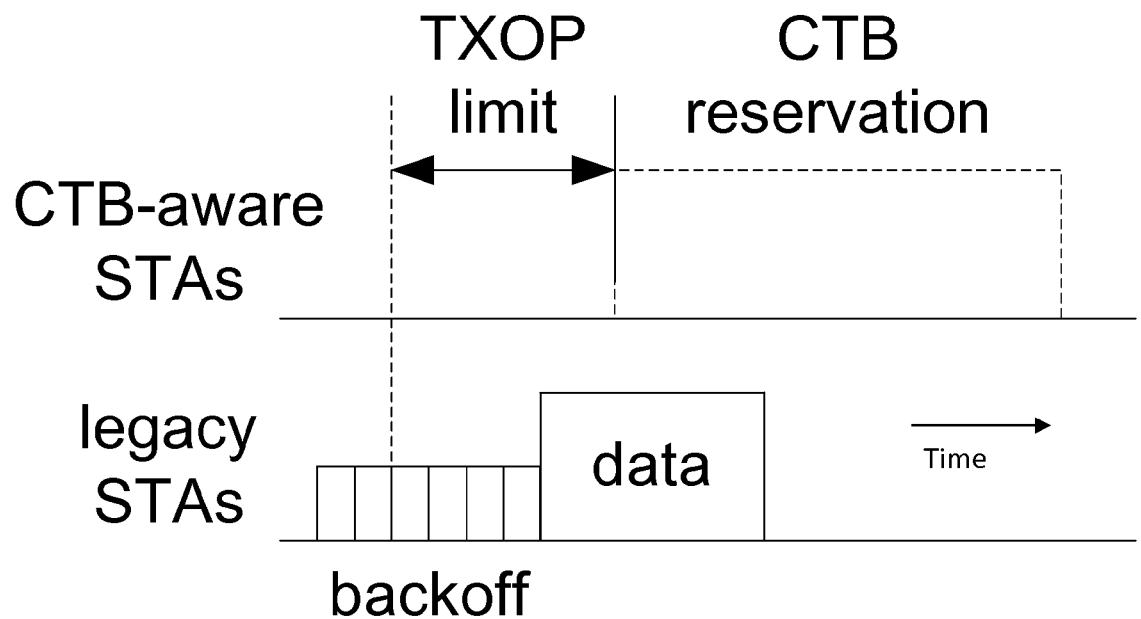
FIG. 10 shows a channel access timing scenario for multiple wireless stations where legacy stations and CTB-aware stations operate on a shared channel in a wireless network.

In one example, one or more stations in FIG. 1 are legacy stations and other stations are reservation-aware stations (i.e., non-legacy wireless stations). FIG. 10 shows a channel access timing scenario 120 for multiple wireless stations (STAs) where legacy stations and CTB-aware stations operate on a shared channel. Legacy stations are not equipped to utilize CTB reservations. The channel access process disclosed herein enables non-legacy CTB-owner stations to maintain guaranteed timing access in the presence of legacy stations.

A CTB-owner station protects its reserved CTB reservation and spoofs the legacy stations by contending for the channel. The CTB-owner station sends signaling packet(s) during a specific period ahead of its CTB start time to set up appropriate channel access prohibition timers such as Network Allocation Vector (NAV) timers at legacy stations. Thus, legacy stations cannot gain channel access in a reserved CTB and within a Transmit Opportunity (TXOP) limit before it. NAV is a counter maintained by each station, indicating the time to elapse until the channel is free again, such that a station such as a legacy station cannot transmit until its NAV is zero.

For example, a CTB-owner station protects its CTB reservation and spoofs the legacy stations by contending the channel and sending a clear-to-send (CTS)-to-Self type signaling packet during a specific period ahead of its CTB start time, to set up appropriate NAV timers at legacy stations, wherein legacy stations cannot occupy the channel during the reserved CTB. Between the CTS-to-Self and the CTB start time, CTB-aware stations (i.e., non-legacy stations) may still access the channel following green field operations (i.e., pure non-legacy mode in contrast to mixed operation mode) under the channel time reservation scheme.

As such, the invention provides essentially guaranteed timing access in a wireless network in the presence of legacy stations for delay-sensitive or streaming applications which utilize channel time reservation. The invention does not require a coordinator to spoof the legacy stations and is applicable in a distributed reservation system. A CTB-owner station may spoof the legacy stations so that guaranteed timing access is still maintained for CTB reservations. Example implementations are detailed below.

Channel Time Reservation Coexistence with Legacy Stations

In one implementation of the invention, the baseline channel access scheme in the wireless network is contention-based, such as CSMA/CA in IEEE 802.11. Legacy stations are only aware of the baseline channel access scheme. Coexisting with the baseline medium access scheme is a channel time reservation scheme for non-legacy stations to reserve CTBs over periodic time periods (e.g., superframes). CTB-aware stations follow the channel access rules based on the distributed channel time reservation scheme, according to the invention.

Legacy Coexistence in a Single CTB-Owner Case

For a single CTB-owner station case, the CTB-owner station sends a clear-to-send (CTS)-to-Self type signaling packet as early as: 1 Transmit Opportunity (TXOP) limit+ PCF Inter-frame Spacing (PIFS), before the start time of the CTB and sets ups the NAV timers of legacy stations till at least the owner station reservation. The coexistence process is exemplified by examples scenarios described below.

The channel becomes idle at time
$t > \text{CTB\_starting\_time} - \Delta s, \Delta s = \text{TXOP\_limit} + \text{PIFS}$  Scenario 1.

Figure 11:
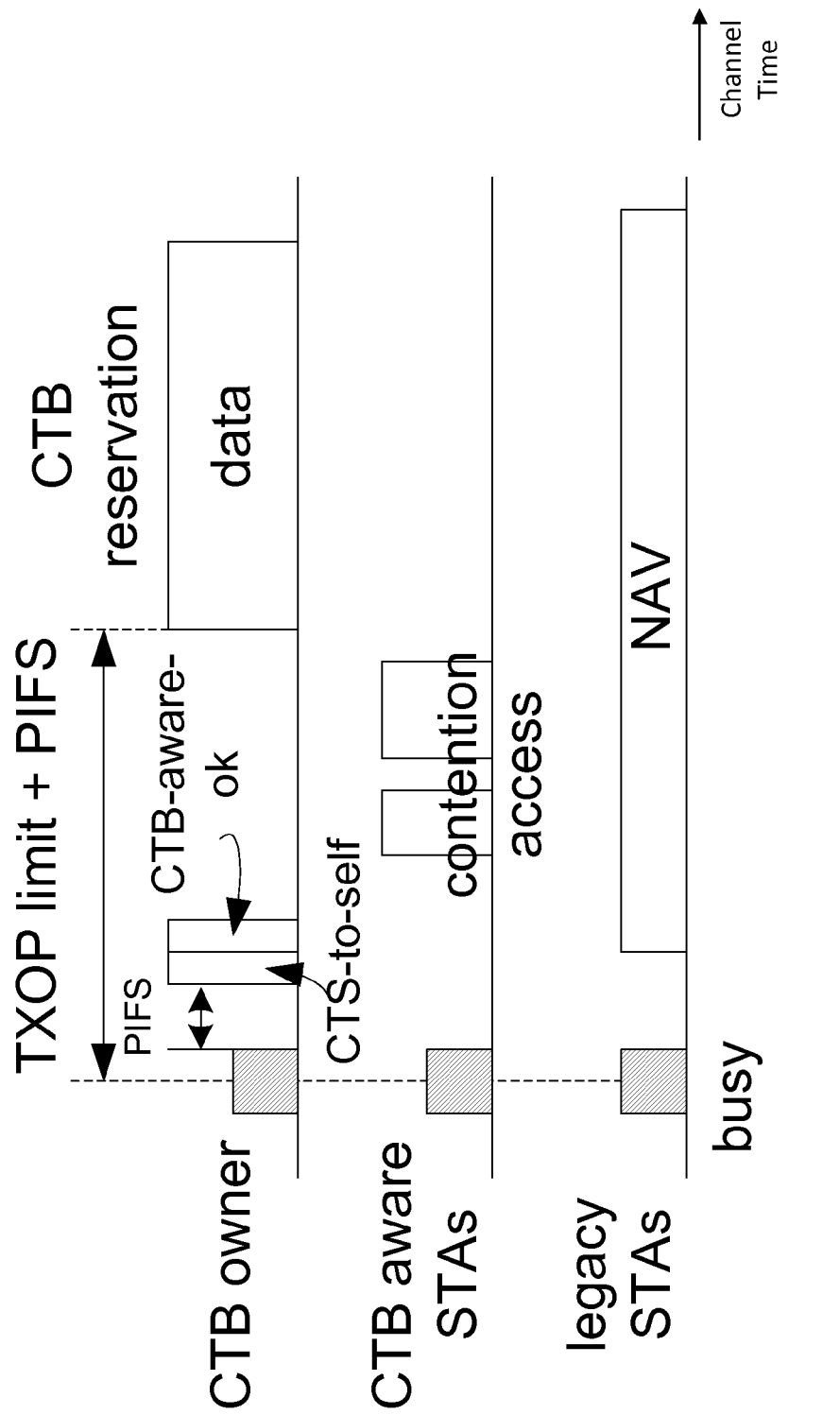
FIG. 11 shows an example channel access timing scenario for a single CTB-owner station in a wireless network including a legacy station, according to the invention.

Referring to the example channel access timing scenario 130 in FIG. 11 for single CTB-owner case according to an embodiment of the invention, the channel becomes idle within (TXOP limit+PIFS) time before the start of a reserved CTB. In this scenario, the coexistence procedures for a CTB-owner station, legacy contention stations, and CTB-aware stations (but not owner), are respectively as follows:

CTB-owner station: Transmits a CTS-to-Self signal message at time min[t+PIFS, CTB_starting_time]. This signaling message is contention-free with respect to legacy contention stations.

Legacy stations: Upon receiving the CTS-to-Self, set NAV accordingly to the end of CTB (or in another implementation, set NAV to the CTB start time plus the time required for the CTB-owner station to set up protection for the reserved transmission).

CTB-aware stations: The CTS-to-Self signaling includes a segment indicating a CTB-aware OK message that only CTB-aware stations utilize. Thus, CTB-aware stations may still use normal contention for channel access before the reserved CTB starts.

The channel becomes idle at time
$t \leq \text{CTB\_starting\_time} - \Delta s$  Scenario 2.

Figure 12:
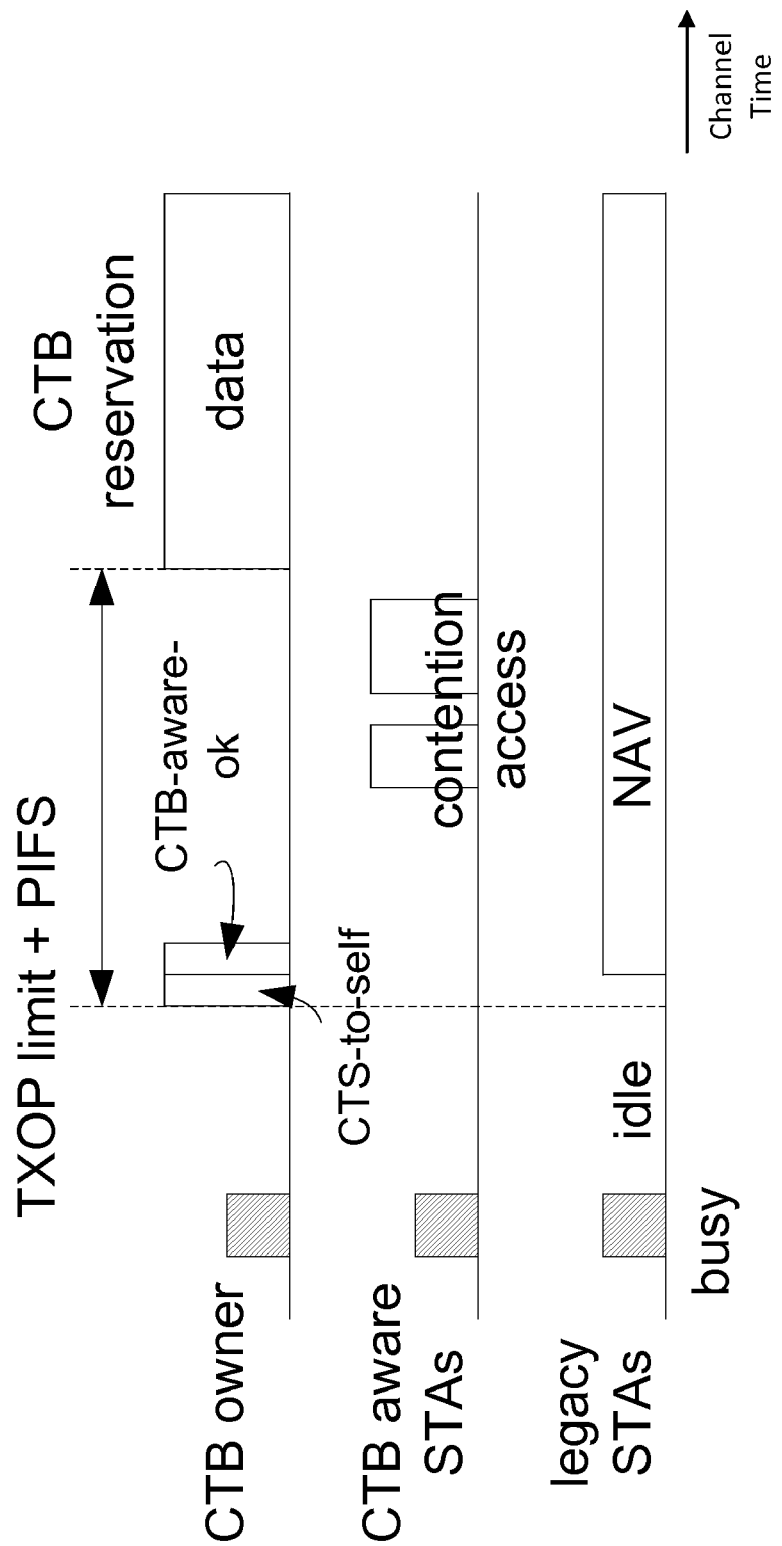
FIG. 12 shows another example channel access timing scenario for a single CTB-owner station in a wireless network including a legacy station, according to the invention.

Referring to another example channel access timing scenario 140 in FIG. 12 for single CTB-owner case, the channel becomes idle at more than (TXOP limit+PIFS) time before the start of the reserved CTB. In this scenario, the procedures for a CTB-owner station, legacy contention stations, and CTB-aware stations (but not owner), are respectively as follows:

CTB-owner station: If the channel continues to stay idle, the CTB-owner station transmits CTS-to-Self at time max[CTB_starting_time−Δs, t+PIFS]. Once the channel stays idle for more than PIFS time, the channel is available for any station to contend and no exception for CTS-to-Self. To resolve potential contention failures, immediately after the CTB-owner station transmits CTS-to-Self, upon sensing a busy channel the station will monitor the channel and re-transmit CTS-to-Self at PIFS time after channel becomes idle.

Legacy stations: Set NAV accordingly, similar to scenario 1.

CTB-aware stations: Access the channel similar to scenario 1.

In another implementation, when CTS-to-Self message timing and the CTB starting time are close enough (such that other CTB-aware stations can detect transmissions of the CTB-owner at the CTB starting time), a CTB-owner station may choose to skip the CTS-to-Self message. In another implementation, if the CTB-owner reserves multiple consecutive CTBs, it may send CTS-to-Self messaging once to set legacy STA NAV timers covering its multiple reserved CTBs.

Legacy Coexistence in Multiple CTB-Owner Case

In case of multiple stations as CTB-owners, an additional back-to-back CTS-to-Self mechanism is provided to resolve collision issues. Between the CTS-to-Self and the CTB start time, CTB-aware stations can still access the channel following green-field operations. In another implementation, a coordinator station may spoof the legacy stations on behalf of the CTB-owner stations. In another implementation, said PIFS interval may be replaced by any inter-frame spacing that provides CTB-aware stations priority to access the channel over legacy stations.

Figure 13:
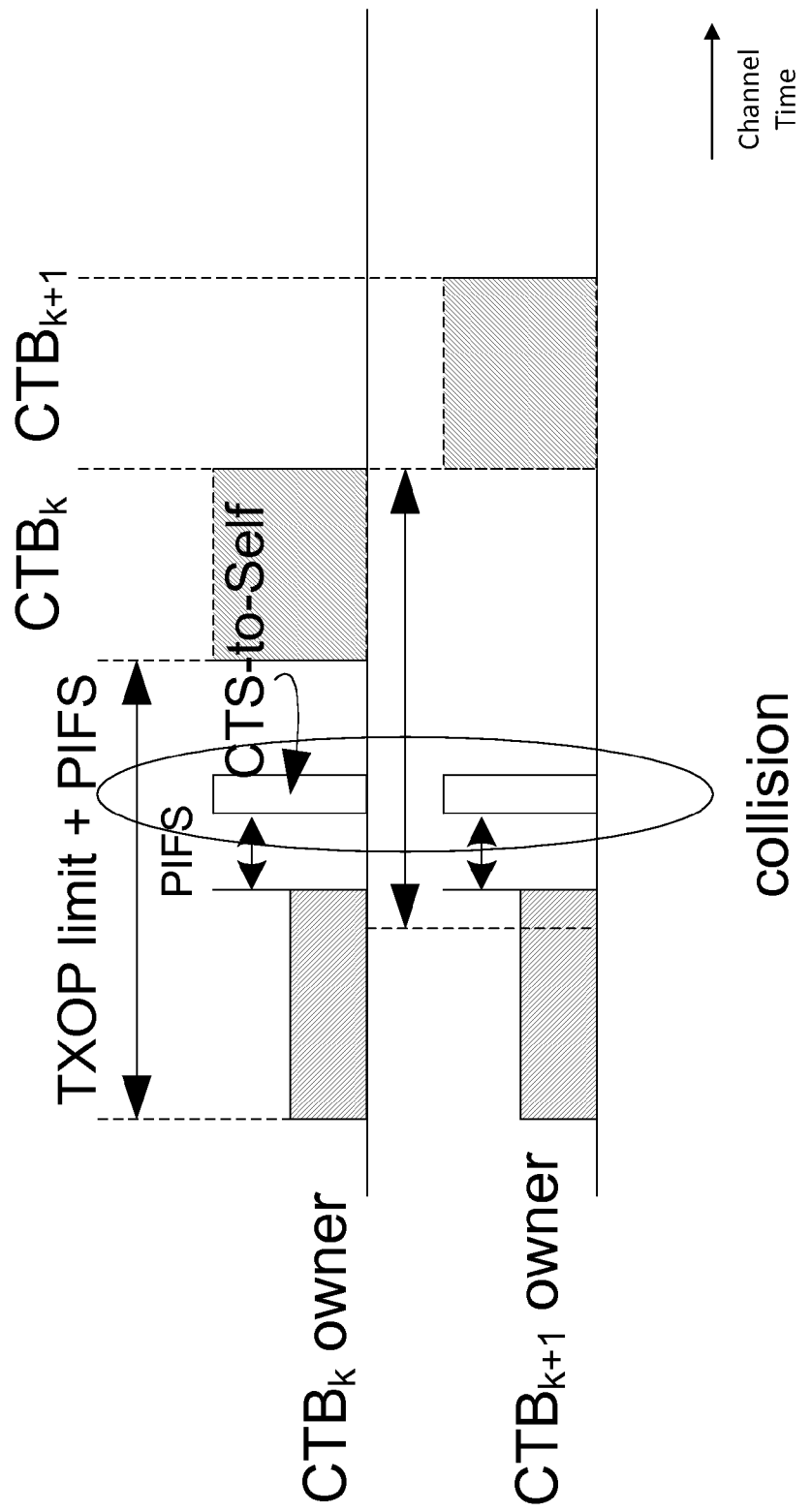
FIG. 13 shows an example channel access timing scenario for multiple CTB-owner stations in a wireless network including a legacy station, according to the invention.

In case of multiple wireless stations as CTB-owners, each CTB-owner station performs similar functionalities to that in a single CTB-owner station case. However, in spoofing the legacy stations, signaling by each CTB-owner station may collide with each other. As such, additional mechanisms are provided by the invention to resolve potential collisions as specified in the following two example cases a and b below.

a. Δs<CTB_length:
In this case, the legacy coexistence procedure is the same as in single CTB-owner station case.

b. Δs=h*CTB_length, where h≧1:
The same procedure in a single CTB-owner case can be used for scenario 1 in this case. However, in scenario 2 as depicted in channel access timing scenario 150 in FIG. 13, there may be more than one CTB-owner station that desires to send CTS-to-Self at a time, which might cause collision. FIG. 13 illustrates CTS-to-Self collision in case b, scenario 2, in case of multiple CTB-owner stations.

To resolve the collision issue in case b, a back-to-back CTS-to-Self mechanism is employed. Suppose the channel becomes idle at time t≦CTB_starting_time−Δs (scenario 2), then:

∀CTB owner,∃u∈{1,2, . . . ⌊h⌋+1}:(CTB_starting_
time−u·CTB_length)<t≦(CTB_starting_time−
(u−1)·CTB_length)

Figure 14:
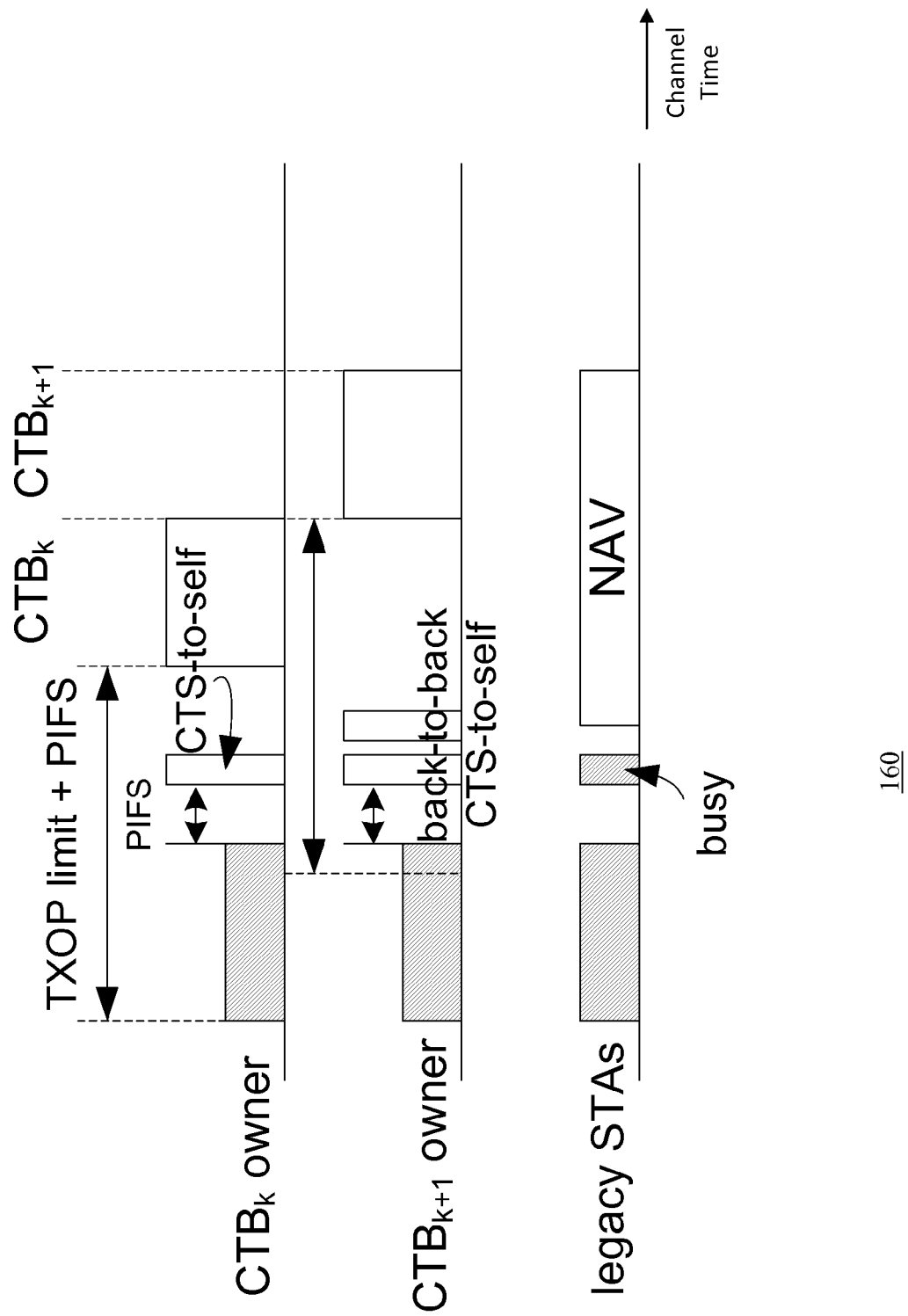
FIG. 14 shows an example channel access timing scenario in for a back-to-back CTS-to-Self mechanism in a wireless network including a legacy station, according to the invention.

As illustrated in channel access timing scenario 160 in FIG. 14, for back-to-back CTS-to-Self mechanism, a CTB-owner transmits u consecutive CTS-to-Self starting at time t+PIFS. In the example of FIG. 14, CTB_length≦TXOP limit+ PIFS<2*CTB_length. Thus, 1≦h<2 and u∈{1, . . . , floor(h)+ 1}={1, 2}. For $CTB_k$ owner station, u=1 and the station would transmit 1 CTS-to-self signals, while for $CTB_{k+1}$ owner, u=2 and the station would transmit 2 consecutive CTS-to-Self signals.

Figure 15:
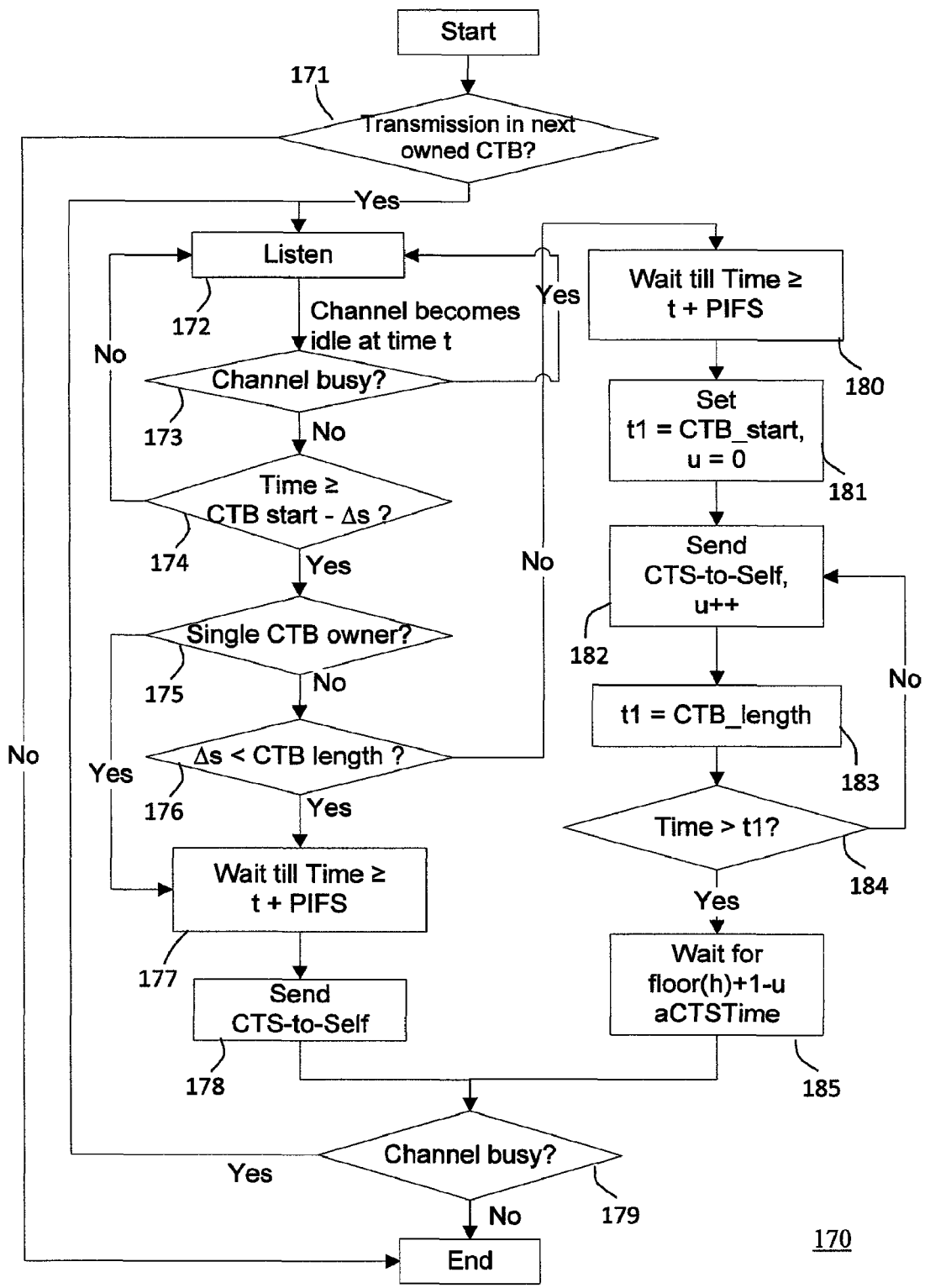
FIG. 15 shows a flowchart of an example process for CTB-aware stations for coexistence with legacy stations for channel access in a wireless network, according to the invention.

FIG. 15 shows a flowchart of an example process 170 for CTB-aware stations for coexistence with legacy stations for channel access, according to an embodiment of the invention. The CTB-aware stations comprise CTB-owner stations. The process 170 includes the following processing blocks:

Block 171: CTB-owner station scheduled to transmission in next owned CTB? If yes, proceed to block 172, else end.
Block 172: Listen/monitor the channel.
Block 173: If the channel is busy, proceed to block 172, else when channel becomes idle at Time=t, proceed to block 174.
Block 174: Time≧CTB_start−Δs? If yes, proceed to block 175, else proceed to block 172.
Block 175: Single CTB-owner station? If yes, proceed to block 177, else proceed to block 176.
Block 176: Δs<CTB_length? If yes, proceed to block 177, else proceed to block 180.
Block 177: Wait till Time≧t+PIFS?
Block 178: Send CTS-to-Self.
Block 179: Monitor channel. If channel is busy, proceed to block 172, else end.
Block 180: Wait till Time≧t+PIFS.
Block 181: Set t1=CTB_start, u=0.
Block 182: Send CTS-to-Self, increment u by 2.
Block 183: Set t1=CTB_length.
Block 184: If Time>t1, then proceed to block 185, else proceed to block 182.
Block 185: Wait for (floor(h)+1−u)*aCTSTime. Proceed to block 179.

Figure 16:
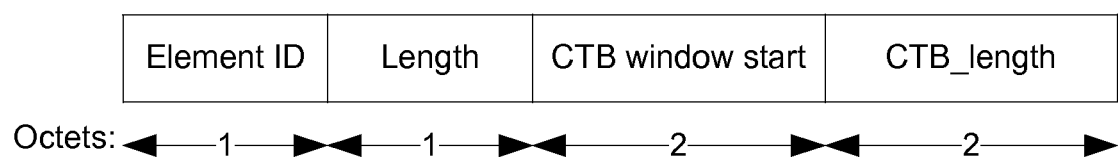
FIG. 16 shows a modified CTB information element (IE) according to the invention for CTB reservation operations in a wireless network.

Example applications of the invention include IEEE 802.11 ad hoc mode. A new CTB information element (IE) 190 according to the invention in shown in FIG. 16 which enables CTB reservation operations in such networks as current IEEE 802.11 ad hoc mode networks. An example CTB reservation scheme is described further below. The CTB IE 190 includes the following fields:

Element ID field: As in IEEE 802.11.
Length field: As in IEEE 802.11.
CTB window start field: A new field indicating starting time offset of a CTB period in a Beacon Interval, referenced to Target Beacon Transmission Time (TBTT).
CTB_length field: A new field indicating the length of the CTB represented in multiples of 32 μs, as in TXOP limit field of Enhanced Distributed Channel Access (EDCA) parameter set element. The value of CTB_length should be stationary throughout the lifetime of Infrastructureless Basic Service Set (IBSS).

CTB aware stations transmit the new CTB IE 190 in beacons. If a CTB-aware station receives a beacon that does not contain the CTB IE 190, that station must use the coexistence channel access mechanisms with legacy stations. A recommended minimum CTB_length is 3.1 ms for simpler operations in IEEE 802.11a/g ad hoc legacy coexistence.

Figure 17:
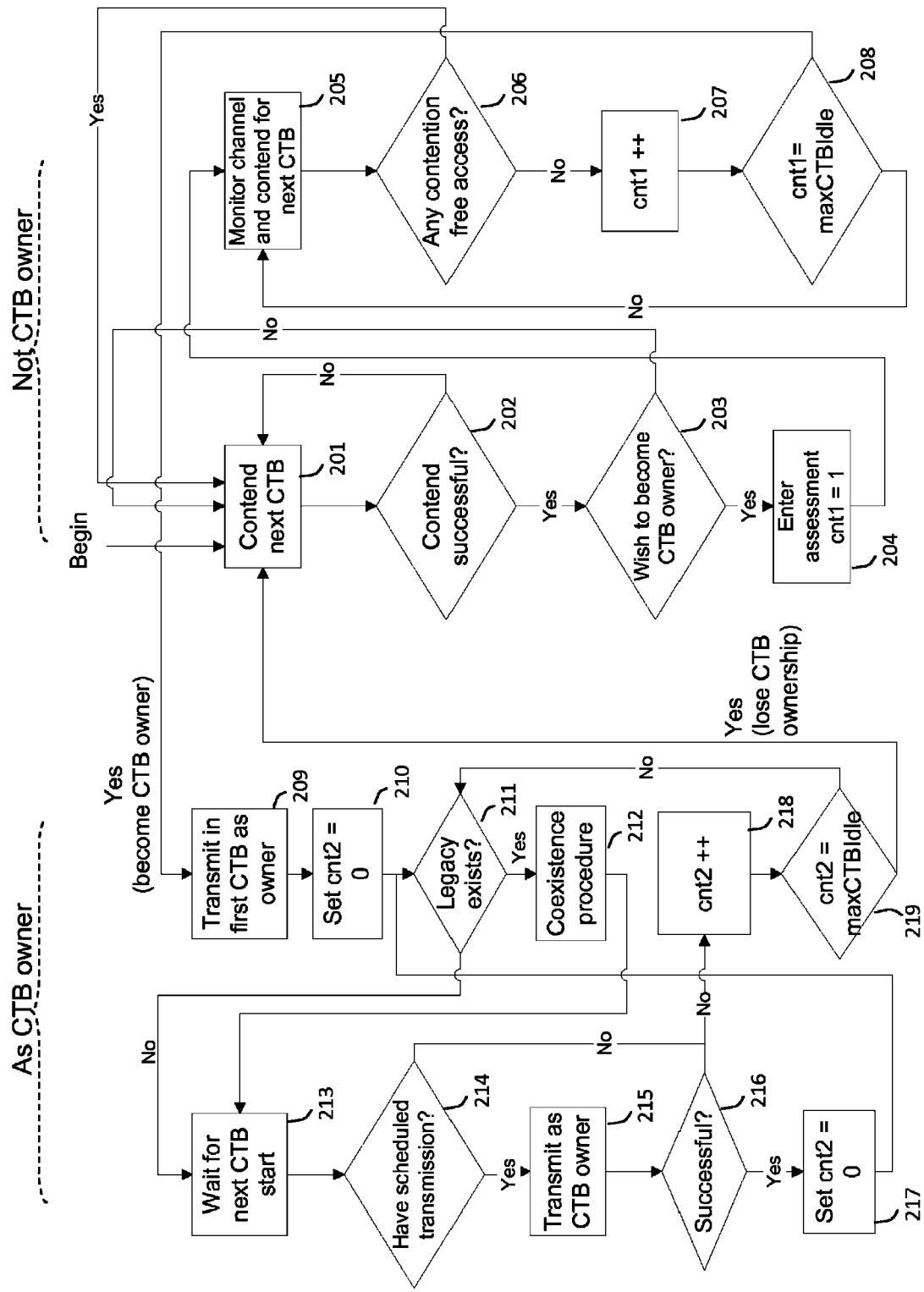
FIG. 17 shows a flowchart of an example process implemented by a CTB-aware station operation for a single CTB-owner station in coexistence with legacy stations for channel access in a wireless network, according to an embodiment of the invention.

FIG. 17 shows a flowchart of an example process 200 implemented by a CTB-aware station operation for a single CTB-owner station in coexistence with legacy stations for channel access in a wireless network, according to an embodiment of the invention. The process 200 includes the following process blocks:

Block 201: Begin as non-CTB-owner station and contend for a next CTB.
Block 202: Contention successful? If yes, proceed to block 203, else proceed to block 201.
Block 203: Wish to become owner of $CTB_k$? If yes, proceed to block 204, else proceed to block 201.
Block 204: Enter assessment phase and set cnt1=1.
Block 205: Monitor (observe) the channel and contend for a next CTB.
Block 206: Any contention free access opportunity detected? If yes, proceed to block 201, else proceed to block 207.
Block 207: Increment cnt1 by one.
Block 208: Determine if cnt1=maxCTBIdle. If yes, proceed to block 209, else proceed to block 205.
Block 209: Become CTB-owner station and transmit in first $CTB_k$ as owner.
Block 210: Set cnt2=0.
Block 211: Determine if a legacy station exists in the network. If yes, proceed to block 212, else proceed to block 213.
Block 212: Perform coexistence procedure (e.g., process 170 in FIG. 15). Proceed to block 213.
Block 213: Wait for next $CTB_k$.
Block 214: Determine if a transmission is scheduled. If yes, proceed to block 215, else proceed to block 218.
Block 215: Transmit on channel as $CTB_k$-owner station.
Block 216: Determine if transmission successful. If yes, proceed to block 217, else proceed to block 218.
Block 217: Set cnt2=0. Proceed to block 211.
Block 218: Increment cnt2 by two.
Block 219: Determine if cnt2=maxCTBIdle. If yes, lose ownership of the $CTB_k$ and proceed to block 201, else, proceed to block 211.

Figure 18:
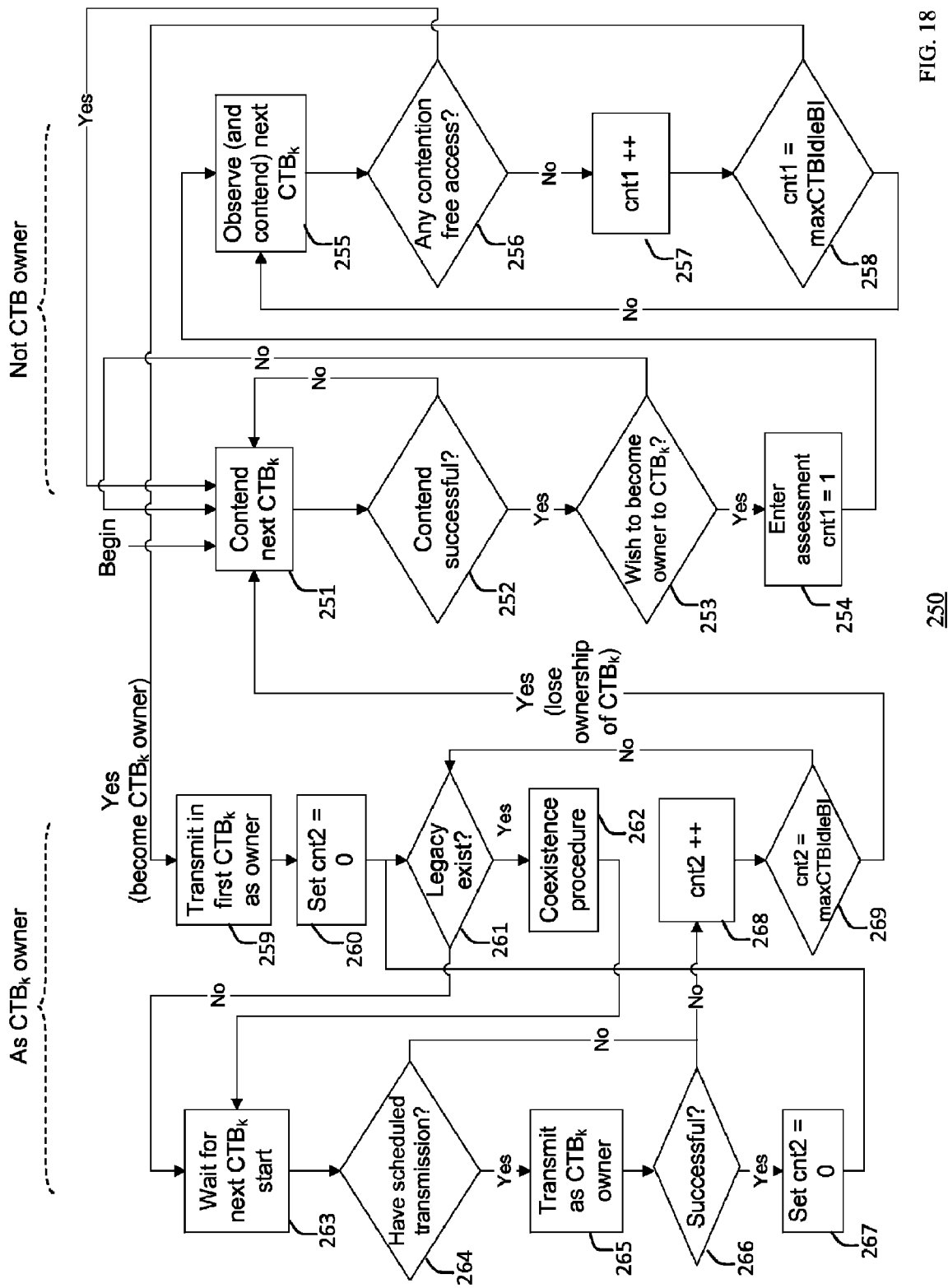
FIG. 18 shows a flowchart of an example process implemented by a CTB-aware station operation for multiple CTB-owner stations in coexistence with legacy stations for channel access in a wireless network, according to an embodiment of the invention.

FIG. 18 shows a flowchart of an example process 250 implemented by a CTB-aware station operation for multiple CTB-owner stations in coexistence with legacy stations for channel access in a wireless network, according to an embodiment of the invention. The process 250 includes the following process blocks:

Block 251: Begin as non-CTB-owner station and contend for a next $CTB_k$.
Block 252: Contention successful? If yes, proceed to block 253, else proceed to block 251.
Block 253: Wish to become owner of $CTB_k$? If yes, proceed to block 254, else proceed to block 251.
Block 254: Enter assessment phase and set cnt1=1.
Block 255: Monitor (observe) the channel and contend for $CTB_k$.
Block 256: Any contention free access opportunity detected? If yes, proceed to block 251, else proceed to block 257.
Block 257: Increment cnt1 by one.
Block 258: Determine if cnt1≧maxCTBIdleBI. If yes, proceed to block 259, else proceed to block 255.
Block 259: Become $CTB_k$ owner transmit in first $CTB_k$ as owner.
Block 260: Set cnt2=0.
Block 261: Determine if a legacy station exists in the network. If yes, proceed to block 262, else proceed to block 263.
Block 262: Perform coexistence procedure (e.g., process 170 in FIG. 15). Proceed to block 263.
Block 263: Wait for next $CTB_k$ start.
Block 264: Determine if a transmission is scheduled. If yes, proceed to block 265, else proceed to block 268.
Block 265: Transmit on the channel as $CTB_k$-owner station.

Block 266: Determine if transmission successful. If yes, proceed to block 267, else proceed to block 268.
Block 267: Set cnt2=0. Proceed to block 261.
Block 268: Increment cnt2 by two.
Block 269: Determine if cnt2=maxCTBIdleBI. If yes, lose ownership of the CTB and proceed to block 251, else, proceed to block 261.

CTB Reservation Scheme

A wireless station that desires to reserve a certain CTB for contention-free access must first contend for the CTB. If the station successfully contends in the CTB, it retains in memory (remembers) information about the timing (i.e., which CTB) of the successful contention and attempt to reserve future CTBs (in either the same relative CTB location in future superframes or any set of subsequent CTBs within the current superframe or in future superframes), according to the traffic specification/pattern of the station. The wireless station enters an assessment stage to observe whether it can reserve the CTB without interfering with other channel transmissions that already reserve the target (intended) CTB(s). If the wireless station concludes that it can reserve the CTB without interfering with other channel transmissions that already reserve the target CTB(s), then the wireless station becomes a CTB-owner and has a contention-free reservation in the CTB(s) until it releases such ownership or until such ownership expires.

In a communication network where multiple wireless stations share a wireless communication medium, the clock for every wireless station is synchronized. There is a predefined sequence of CTBs for channel access in a superframe. The baseline MAC scheme is contention based, such as CSMA/CA in IEEE 802.11. The wireless stations do not use any announcement or explicit information exchange to negotiate/reserve the use of the medium. According to the invention, if a wireless station successfully contends in a superframe, it may retain in memory the timing of the successful contention and attempt to duplicate such successful medium access in future CTBs. This eventually results in a contention-free, reservation-based channel time access in either the same CTB location in future superframes or any set of subsequent CTBs within the current superframe or in future superframes, according to the traffic specification/pattern of the wireless station.

As such, the wireless stations remember their successful contentions and leverage such information for scheduling contention-free reservations in a superframe. In one implementation, the invention provides a distributed channel access procedure that leverages previous successful contention experiences of a wireless station in a wireless network. The invention is applicable to IEEE 802.11 contention-based MAC framework and also millimeter wave (mmW) network systems. The invention is suitable for audio/video (A/V) QoS centric isochronous/asynchronous traffic. Further, the invention is suitable for communication over one or more wireless channels.

Advantages and Comparisons

TABLE 1

Comparisons of mixed mode according to the invention, legacy, and green field:

|  | Legacy ad hoc mode | Green field CTB reservation | Mixed mode (legacy coexistence) |
| --- | --- | --- | --- |
| Complexity | Low | Low | Relatively low |
| Dynamic access | Yes | Yes | Yes |
| Beaconing | — | New IE for CTB aware STAs | New IE for CTB aware STAs |
| Messaging overhead | No | No | CTS-to-self for legacy coexistence |
| QoS support | Not sufficient for AV traffics | Provide exact timing access | Provide exact timing access |
| Power saving | Awake for incoming traffic throughout BI | Wake up in the reserved CTBs | Wake up TXOP limit before reserved CTBs |
| Synchronization requirement | Yes | Yes | Yes |

Figure 19:
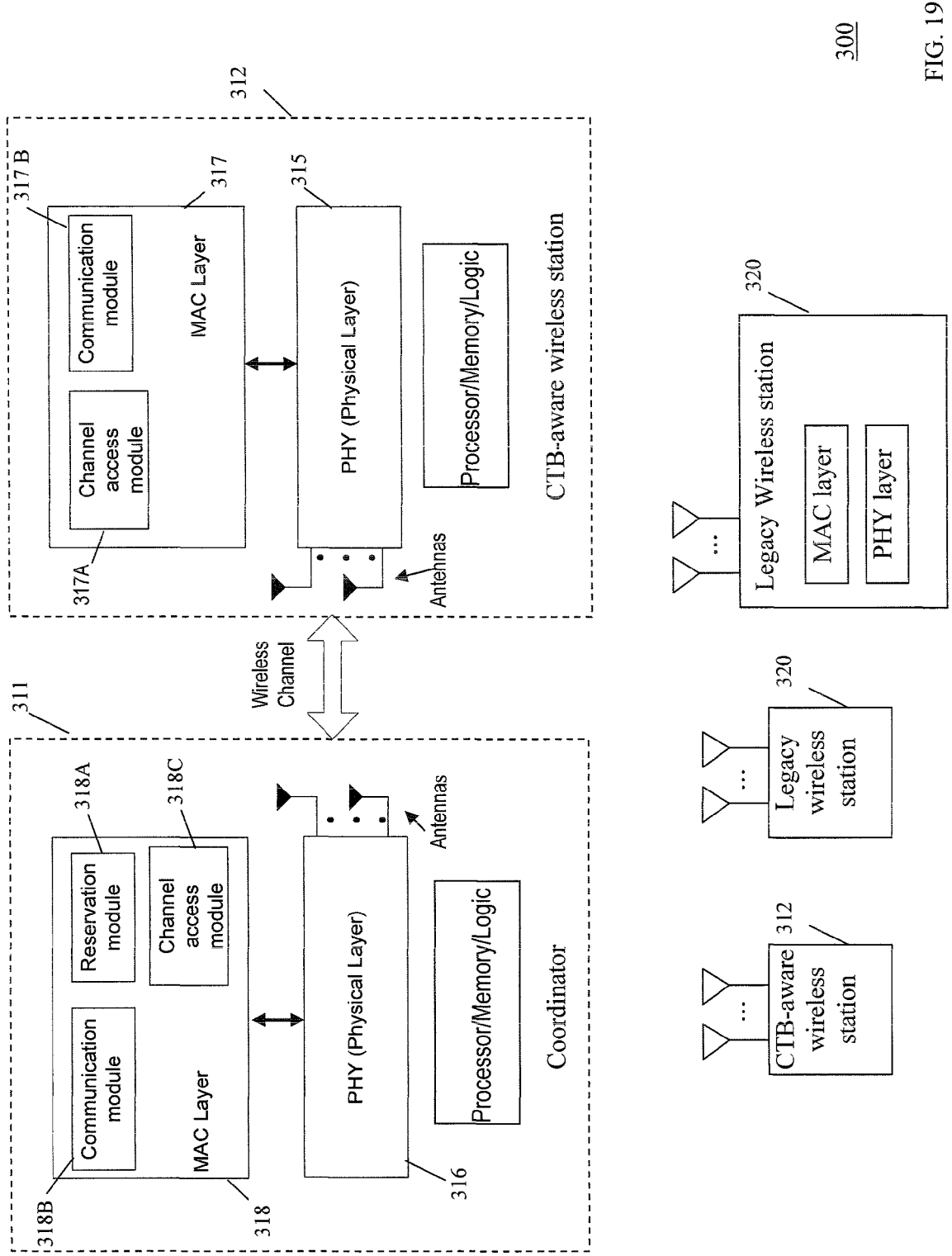
FIG. 19 shows a block diagram of an architecture for an example wireless system/network implementing distributed access to a shared channel by reservation, according to the present invention.

FIG. 19 shows a block diagram of an architecture for an example wireless system/network such as WLAN 300 implementing distributed access to a shared channel by reservation, according to the present invention. The network 300 comprising multiple wireless stations including a coordinator wireless station 311, one or more CTB-aware wireless stations 312 and one or more legacy wireless stations 320. The coordinator 311 includes a PHY layer 316 and a MAC layer 318. The MAC layer 318 implements a reservation module 318A, a communication module 318B and a channel access module 318C. The station 312 includes a PHY layer 315 and a MAC layer 317. The MAC layer 317 implements a channel access module 317A and communication module 317B. Each PHY layer 315, 316, may comprise one or multiple antennas. Each wireless legacy station 320 includes conventional MAC and PHY layers.

Each of the channel access modules 317A and 318C implements channel time reservation by learning past channel access contention results and utilizes legacy coexistence procedures, according to the embodiments of the invention. In one implementation, the channel access modules 317A and 318C implement channel time access as described in relation to FIGS. 4-9 and FIGS. 14-19. Further, the reservation module 318A implements a limited coordination function (described further above) as may be needed. The communication modules 318B, 317B enable the coordinator 311 and a station 312 to communicate over a shared wireless channel via the PHY layers (e.g., sending and receiving packets, etc.). An aspect of the architecture 300 comprises peer-to-peer operation among the wireless stations 311, 312, 320, according to the invention.

As is known to those skilled in the art, the aforementioned example architectures described above, according to the present invention, can be implemented in many ways, such as program instructions for execution by a processor, as software modules, as microcode, as computer program products on computer readable media, as logic circuits, as application specific integrated circuits, as firmware, as consumer electronic devices, etc.

The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device. The medium can be electronic, magnetic, optical, or a semiconductor system (or apparatus or device). Examples of a computer-readable medium include, but are not limited to, a semiconductor or solid state memory, magnetic tape, a removable computer diskette, a RAM, a read-only memory (ROM), a rigid magnetic disk, an optical disk, etc. Current examples of optical disks include compact disk-read-only memory (CD-ROM), compact disk-read/write (CD-R/W) and DVD.

I/O devices (including but not limited to keyboards, displays, pointing devices, etc.) can be connected to the system either directly or through intervening controllers. Network adapters may also be connected to the system to enable the data processing system to become connected to other data processing systems or remote printers or storage devices through intervening private or public networks. Modems, cable modem and Ethernet cards are just a few of the currently available types of network adapters. In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

The terms "computer program medium," "computer usable medium," "computer readable medium," and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information, from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor or multi-core processor to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements described herein are intended to include any structure, material, or act for performing the function in combination with other elements. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method of providing access to a shared communication channel in a wireless network including multiple wireless stations, the method comprising:
  performing distributed channel time reservation for contention-free access to a shared wireless channel by each wireless station, based on a prior successful contention by the wireless station for access to the channel in a wireless network.

2. The method of claim 1 wherein performing said distributed channel time reservation comprises:
   a wireless station contending for access to the channel;
   upon successful contention, the wireless station obtaining ownership of a channel time block (CTB) by reserving the CTB as a CTB-owner station for transmitting on the channel during the owned CTB; and
   the wireless station retaining information about the successful contention for performing future contention-free channel reservations.

3. The method of claim 2 further comprising:
   the wireless station attempting a contention-free channel reservation based on the retained information about said successful contention.

4. The method of claim 3, wherein said information about the successful contention comprises timing of said owned CTB in a specific channel time period comprising a superframe, wherein each superframe comprises multiple CTBs.

5. The method of claim 4, wherein attempting a contention-free channel reservation based on said retained information comprises:
   the wireless station attempting a reservation-based channel access in a subsequent CTB within a current superframe or in a future superframe based on timing of said owned CTB within a superframe, according to the data traffic characteristics of the wireless station.

6. The method of claim 4, wherein attempting a contention-free channel reservation based on the retained information comprises:
   the wireless station attempting a reservation-based channel access in a target CTB in a future superframe, the target CTB having the same relative time location as the owned CTB in the current superframe.

7. The method of claim 6, wherein attempting a contention-free channel reservation based on the retained information comprises:
   the wireless station attempting a reservation-based channel access in a target CTB in a future superframe, the target CTB having the same relative time location as the owned CTB in the current superframe, wherein multiple wireless stations contend for CTBs.

8. The method of claim 4 wherein attempting a contention-free channel reservation based on the retained information comprises:
   the wireless station entering an assessment stage for:
      determining if its transmissions during a target CTB may cause interference to any existing CTB-owner station of the target CTB in an upcoming superframe; and
      determining if its transmissions during a target CTB may cause interference to any existing CTB-owner station of the target CTB in an upcoming CTB in the current superframe.

9. The method of claim 8, wherein attempting a contention-free channel reservation based on the retained information further comprises:
   upon determining lack of interference with any existing CTB-owner station, the wireless station obtaining ownership of the target CTB as owner of the target CTB.

10. The method of claim 9 further comprising:
    upon becoming owner of a CTB, the wireless station initiating channel access in a contention free period of the owned CTB and scheduling transmissions therein, until the wireless station releases its ownership of the owned CTB or until its ownership expires.

11. The method of claim 10 wherein:
    each CTB provides contention-free access and all-access opportunities; and
    contending for channel access comprises the wireless station contending for at least a portion of a CTB that is unused by any CTB-owner station outside contention-free opportunities.

12. The method of claim 10 further comprising:
    for schedule fairness between multiple wireless stations, specifying contention-based channel access priorities based on the quantity of CTB-ownership of each wireless station.

13. The method of claim 1 further comprising performing said distributed channel time block reservation in the absence of a network coordinator.

14. The method of claim 1 wherein:
    the wireless network comprises a legacy wireless station and non-legacy wireless stations, wherein only the non-legacy wireless stations are reservation-aware;
    distributed CTB reservation further comprises:
       performing timing-based spoofing of the legacy station to protect the owned CTB as reserved by a CTB-owner station from access by the legacy station.

15. The method of claim 14 further comprising:
    the legacy station utilizing a contention-based baseline channel access scheme;
    the non-legacy stations utilizing a distributed channel time reservation access scheme;
    such that performing timing-based spoofing of the legacy station allows coexistence of the channel time reservation scheme for non-legacy stations with the baseline medium access scheme for the non-legacy station in the wireless network.

16. The method of claim 15, wherein timing-based spoofing of the legacy station comprises:
    the CTB-owner wireless station transmitting a spoofing signal during a specific period ahead of its CTB start time, to set an appropriate access prohibition timer at the legacy station such that the legacy station cannot gain channel access in the owned CTB and within a transmit opportunity time limit before the CTB, until the timer expires.

17. The method of claim 16 wherein:
    said access prohibition timer comprises a Network Allocation Vector (NAV) timer; and
    said spoofing signal comprises a clear-to-send (CTS)-to-Self type signal.

18. The method of claim 17 wherein the wireless network comprises a wireless local area network (WLAN).

19. A wireless communication system, comprising:
    plural wireless stations;
    wherein a wireless station comprises a channel access module configured for performing distributed channel time reservation for contention-free access to a shared wireless channel by the wireless station, based on a prior successful contention by the wireless station for access to the channel.

20. The system of claim 19, wherein the channel access module is further configured such that:
    the wireless station contends for access to the channel, and upon successful contention the wireless station obtains ownership of a channel time block (CTB) by reserving the CTB as a CTB-owner station for transmitting on the channel during the owned CTB, wherein the wireless station retains information about the successful contention for performing future contention-free channel reservations.

21. The system of claim 20, wherein the channel access module is further configured such that:
the wireless station attempts a contention-free channel reservation based on the retained information about said successful contention.

22. The system of claim 21, wherein said information about the successful contention comprises timing of said owned CTB in a specific channel time period comprising a superframe, wherein each superframe comprises multiple CTBs.

23. The system of claim 22, wherein the channel access module is further configured such that:
the wireless station attempts a reservation-based channel access in a subsequent CTB within a current superframe or in a future superframe based on timing of said owned CTB within a superframe, according to the data traffic characteristics of the wireless station.

24. The system of claim 22, wherein the channel access module is further configured such that:
the wireless station attempts a reservation-based channel access in a target CTB in a future superframe, the target CTB having the same relative time location as the owned CTB in the current superframe.

25. The system of claim 24, wherein the channel access module is further configured such that:
the wireless station attempts a reservation-based channel access in a target CTB in a future superframe, the target CTB having the same relative time location as the owned CTB in the current superframe, wherein multiple wireless stations contend for CTBs.

26. The system of claim 24, wherein the channel access module is further configured such that:
in attempting a reservation-based channel access, the wireless station enters an assessment stage for determining if its transmissions during a target CTB may cause interference to any existing CTB-owner station of the target CTB in an upcoming superframe, and determining if its transmissions during a target CTB may cause interference to any existing CTB-owner station of the target CTB in an upcoming CTB in the current superframe.

27. The system of claim 26, wherein the channel access module is further configured such that:
upon determining lack of interference with any existing CTB-owner station, the wireless station obtains ownership of the target CTB as owner of the target CTB.

28. The system of claim 27, wherein the channel access module is further configured such that:
upon becoming owner of a CTB, the wireless station initiates channel access in a contention-free period of the owned CTB and schedules transmissions therein, until the wireless station releases its ownership of the owned CTB or until its ownership expires.

29. The system of claim 28, wherein:
each CTB provides contention-free access and all-access opportunities;
the wireless channel contends for at least a portion of a CTB that is unused by any CTB-owner station outside contention-free opportunities.

30. The system of claim 28, wherein for schedule fairness between multiple wireless stations, contention-based channel access priorities are specified based on the quantity of CTB-ownership of each wireless station.

31. The system of claim 19, wherein:
wherein one of the plural wireless stations comprises a legacy wireless station and one or more of the plural wireless stations comprises non-legacy wireless stations, wherein only the non-legacy wireless stations are reservation-aware;
the channel access module is further configured for distributed CTB reservation by performing a timing-based spoofing of the legacy station to protect the owned CTB as reserved by a CTB-owner station from access by the legacy station.

32. The system of claim 31, wherein:
the legacy station utilizes a contention-based baseline channel access scheme;
the non-legacy stations utilize a distributed channel time reservation access scheme;
such that performing timing-based spoofing of the legacy station allows coexistence of the channel time reservation scheme for non-legacy stations with the baseline medium access scheme for the non-legacy station in the wireless network.

33. The system of claim 32, wherein the CTB-owner wireless station transmits a spoofing signal during a specific period ahead of its CTB start time, to set an appropriate access prohibition timer at the legacy station such that the legacy station cannot gain channel access in the owned CTB and within a transmit opportunity time limit before the CTB, until the timer expires.

34. The system of claim 33, wherein:
said access prohibition timer comprises a Network Allocation Vector (NAV) timer; and
said spoofing signal comprises a clear-to-send (CTS)-to-Self type signal.

35. The system of claim 34, wherein the wireless system comprises a wireless local area network (WLAN).

36. A wireless station, comprising:
a channel access module configured for performing distributed channel time reservation for contention-free access to a shared wireless channel by the wireless station, based on a prior successful contention by the wireless station for access to the channel; and
a physical layer for transmitting information over the wireless channel.

37. The wireless station of claim 36, wherein the channel access module is further configured such that the wireless station contends for access to the channel, and upon successful contention the wireless station obtains ownership of a channel time block (CTB) by reserving the CTB as a CTB-owner station for transmitting on the channel during the owned CTB, wherein the wireless station retains information about the successful contention for performing future contention-free channel reservations.

38. The wireless station of claim 37, wherein the channel access module is further configured such that the wireless station attempts a contention-free channel reservation based on the retained information about said successful contention, and wherein said information about the successful contention comprises timing of said owned CTB in a specific channel time period comprising a superframe, such that each superframe comprises multiple CTBs.

39. The wireless station of claim 38, wherein the CTB-owner wireless station transmits a spoofing signal during a specific period ahead of its CTB start time, to set an appropriate access prohibition timer at the legacy station such that the legacy station cannot gain channel access in the owned CTB and within a transmit opportunity time limit before the CTB, until the timer expires.

40. The wireless station of claim 37, wherein:
the legacy station utilizes a contention-based baseline channel access scheme;

the CTB-owner station as a non-legacy station utilizes a distributed channel time reservation access scheme;

such that performing timing-based spoofing of the legacy station allows coexistence of the channel time reservation scheme for the CTB-owner station with the baseline medium access scheme for the legacy station in a wireless network.

41. The wireless station of claim 36, wherein the channel access module is configured for performing distributed CTB reservation by timing-based spoofing of a legacy wireless station to protect the owned CTB as reserved by the CTB-owner station from access by the legacy station.

* * * * *